US006991706B2

(12) United States Patent
Lindsay et al.

(10) Patent No.: US 6,991,706 B2
(45) Date of Patent: Jan. 31, 2006

(54) CLOTHLIKE PATTERN DENSIFIED WEB

(75) Inventors: Jeffrey Dean Lindsay, Appleton, WI (US); Michael Alan Hermans, Neenah, WI (US); Mike Thomas Goulet, Neenah, WI (US); Mark John Hassman, Appleton, WI (US); Maurizio Tirimacco, Appleton, WI (US); Jeffrey Janne Johnson, Neenah, WI (US); Rebecca Catherine Mohr, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 10/654,219

(22) Filed: Sep. 2, 2003

(65) Prior Publication Data

US 2005/0045292 A1 Mar. 3, 2005

(51) Int. Cl.
*D21H 21/18* (2006.01)
*D21H 27/02* (2006.01)
*D21H 27/30* (2006.01)
*D21H 19/74* (2006.01)
*B32B 29/00* (2006.01)

(52) U.S. Cl. ...................... 162/109; 162/112; 162/113; 162/135; 162/134; 162/169; 162/123; 162/158; 162/164.1; 162/162; 156/277; 156/183; 427/391

(58) Field of Classification Search ................ 162/109, 162/111–113, 117, 134–135, 158, 169, 164.1, 162/168.1, 161, 162, 123, 125, 129; 156/277, 156/290, 183, 324; 427/361, 391; 264/282, 264/283
See application file for complete search history.

(56) References Cited

U.S. PATENT DOCUMENTS

| | | | | | |
|---|---|---|---|---|---|
| 2,624,245 | A | | 1/1953 | Cluett | |
| 3,011,545 | A | | 12/1961 | Welsh et al. | |
| 3,017,317 | A | | 1/1962 | Voigtman et al. | |
| 3,260,778 | A | | 7/1966 | Walton | |
| 3,301,746 | A | | 1/1967 | Sanford et al. | |
| 3,329,556 | A | | 7/1967 | McFalls et al. | |
| 3,359,156 | A | | 12/1967 | Freuler et al. | |
| 3,416,192 | A | | 12/1968 | Packard | |
| 3,426,405 | A | | 2/1969 | Walton | |
| 3,554,863 | A | | 1/1971 | Hervey et al. | |
| 3,630,837 | A | | 12/1971 | Freuler | |
| 3,660,338 | A | | 5/1972 | Economou | |
| 3,686,151 | A | | 8/1972 | Keim | |
| 3,700,623 | A | | 10/1972 | Keim | |
| 3,772,076 | A | | 11/1973 | Keim | |
| 3,821,068 | A | | 6/1974 | Shaw | |
| 3,879,257 | A | | 4/1975 | Gentile et al. | |
| 3,903,342 | A | * | 9/1975 | Roberts, Jr. | 428/153 |
| 3,926,716 | A | | 12/1975 | Bates | |
| 3,994,771 | A | | 11/1976 | Morgan, Jr. et al. | |
| 4,000,237 | A | | 12/1976 | Roberts, Jr. | |
| 4,072,557 | A | | 2/1978 | Schiel | |
| 4,090,385 | A | | 5/1978 | Packard | |
| 4,125,659 | A | | 11/1978 | Klowak et al. | |
| 4,144,122 | A | | 3/1979 | Emanuelsson et al. | |
| 4,158,594 | A | | 6/1979 | Becker et al. | |
| 4,208,459 | A | * | 6/1980 | Becker et al. | 428/154 |
| 4,326,000 | A | * | 4/1982 | Roberts, Jr. | 428/153 |
| 4,351,699 | A | | 9/1982 | Osborn, III | |
| 4,440,597 | A | | 4/1984 | Wells et al. | |
| 4,442,833 | A | | 4/1984 | Dahlen et al. | |
| 4,483,332 | A | | 11/1984 | Rind | |
| 4,507,173 | A | * | 3/1985 | Klowak et al. | 162/112 |
| 4,528,239 | A | | 7/1985 | Trokhan | |
| 4,529,480 | A | | 7/1985 | Trokhan | |
| 4,529,489 | A | | 7/1985 | McDonald et al. | |
| 4,610,743 | A | * | 9/1986 | Salmeen et al. | 156/183 |
| 4,637,859 | A | | 1/1987 | Trokhan | |
| 4,710,374 | A | | 12/1987 | Grollier et al. | |
| 4,785,030 | A | | 11/1988 | Noda et al. | |
| 4,891,249 | A | | 1/1990 | Mcintyre | |
| 4,919,877 | A | | 4/1990 | Parsons et al. | |
| 4,944,960 | A | | 7/1990 | Sundholm et al. | |
| 4,949,668 | A | | 8/1990 | Heindel et al. | |
| 4,996,091 | A | | 2/1991 | Mcintyre | |
| 5,124,188 | A | | 6/1992 | Roe et al. | |
| 5,129,988 | A | | 7/1992 | Farrington, Jr. | |
| 5,143,776 | A | | 9/1992 | Givens | |
| 5,200,036 | A | | 4/1993 | Noda | |
| 5,312,863 | A | | 5/1994 | Van Rheenen et al. | |
| 5,342,875 | A | | 8/1994 | Noda | |
| 5,366,785 | A | * | 11/1994 | Sawdai | 428/156 |

(Continued)

FOREIGN PATENT DOCUMENTS

DE 34 41 883 A1 5/1986

(Continued)

OTHER PUBLICATIONS

American Society for Testing Materials (ASTM) Designation: D 1544-98, "Standard Test Method for Color of Transparent Liquids (Gardner Color Scale)," pp. 1-2, published Sep. 1998.

(Continued)

*Primary Examiner*—José A. Fortuna
*Assistant Examiner*—B Murphy
(74) *Attorney, Agent, or Firm*—Scott A. Baum

(57) ABSTRACT

An improved paper and the process of making an improved paper web is disclosed. The improved paper is characterized as having two regions; one is a network (or open grid) region and the other is a plurality of domes. At least a portion of either region of the paper web contains a bonding material that penetrates at least partially through the paper's thickness.

86 Claims, 5 Drawing Sheets

U.S. PATENT DOCUMENTS

| | | | | |
|---|---|---|---|---|
| 5,399,412 | A | 3/1995 | Sudall et al. | |
| 5,429,686 | A | 7/1995 | Chiu et al. | |
| 5,494,554 | A | 2/1996 | Edwards et al. | |
| 5,529,664 | A | 6/1996 | Trokhan et al. | |
| 5,529,665 | A | 6/1996 | Kaun | |
| 5,556,509 | A | 9/1996 | Trokhan et al. | |
| 5,593,545 | A | 1/1997 | Rugowski et al. | |
| 5,607,551 | A | 3/1997 | Farrington, Jr. et al. | |
| 5,637,194 | A | 6/1997 | Ampulski et al. | |
| 5,656,132 | A | 8/1997 | Farrington, Jr. et al. | |
| 5,667,636 | A | 9/1997 | Engel et al. | |
| 5,672,248 | A | 9/1997 | Wendt et al. | |
| 5,674,590 | A | 10/1997 | Anderson et al. | |
| 5,709,775 | A | 1/1998 | Trokhan et al. | |
| 5,776,312 | A | 7/1998 | Trokhan et al. | |
| 5,804,036 | A | 9/1998 | Phan et al. | |
| 5,820,730 | A | 10/1998 | Phan et al. | |
| 5,830,321 | A | 11/1998 | Lindsay et al. | |
| 5,837,103 | A | 11/1998 | Trokhan et al. | |
| 5,840,403 | A | 11/1998 | Trokhan et al. | |
| 5,846,379 | A | 12/1998 | Ampulski et al. | |
| 5,855,739 | A | 1/1999 | Ampulski et al. | |
| 5,877,239 | A | 3/1999 | Craun et al. | |
| 5,893,965 | A | 4/1999 | Trokhan et al. | |
| 5,897,745 | A | 4/1999 | Ampulski et al. | |
| 5,904,811 | A | 5/1999 | Ampulski et al. | |
| 5,906,710 | A | 5/1999 | Trokhan | |
| 5,908,889 | A | 6/1999 | Bailey et al. | |
| 5,919,556 | A | 7/1999 | Barnholtz | |
| 5,935,381 | A | 8/1999 | Trokhan et al. | |
| 5,989,682 | A | 11/1999 | Anderson | |
| 5,990,377 | A * | 11/1999 | Chen et al. ................. | 604/381 |
| 6,017,417 | A | 1/2000 | Wendt et al. | |
| 6,039,839 | A | 3/2000 | Trokhan et al. | |
| 6,054,020 | A | 4/2000 | Goulet et al. | |
| 6,063,449 | A | 5/2000 | Koskinen et al. | |
| 6,083,346 | A | 7/2000 | Hermans et al. | |
| 6,096,152 | A | 8/2000 | Anderson et al. | |
| 6,096,169 | A | 8/2000 | Hermans et al. | |
| 6,103,062 | A | 8/2000 | Ampulski et al. | |
| 6,117,270 | A | 9/2000 | Trokhan | |
| 6,117,492 | A | 9/2000 | Goldstein et al. | |
| 6,120,642 | A | 9/2000 | Lindsay et al. | |
| 6,126,784 | A * | 10/2000 | Ficke et al. ................. | 162/184 |
| 6,129,815 | A * | 10/2000 | Larson et al. ............... | 162/112 |
| 6,136,146 | A | 10/2000 | Phan et al. | |
| 6,143,135 | A | 11/2000 | Hada et al. | |
| 6,187,137 | B1 | 2/2001 | Druecke et al. | |
| 6,187,139 | B1 | 2/2001 | Edwards et al. | |
| 6,187,140 | B1 | 2/2001 | Anderson et al. | |
| 6,193,847 | B1 | 2/2001 | Trokhan | |
| 6,197,154 | B1 | 3/2001 | Chen et al. | |
| 6,200,419 | B1 * | 3/2001 | Phan .......................... | 162/130 |
| 6,228,216 | B1 | 5/2001 | Lindsay et al. | |
| 6,309,527 | B1 | 10/2001 | Broekhuis et al. | |
| 6,387,989 | B1 | 5/2002 | Sulzbach et al. | |
| 6,395,957 | B1 * | 5/2002 | Chen et al. ................. | 604/381 |
| 6,410,617 | B1 | 6/2002 | Sulzbach et al. | |
| 6,420,013 | B1 * | 7/2002 | Vinson et al. .............. | 428/154 |
| 6,423,180 | B1 | 7/2002 | Behnke et al. | |
| 6,426,121 | B1 | 7/2002 | Goldstein et al. | |
| 6,462,159 | B1 | 10/2002 | Hamada et al. | |
| 6,464,831 | B1 | 10/2002 | Trokhan et al. | |
| 6,465,556 | B1 | 10/2002 | Pratt et al. | |
| 6,500,289 | B2 * | 12/2002 | Merker et al. .............. | 156/183 |
| 6,506,696 | B2 | 1/2003 | Goldstein et al. | |
| 6,506,821 | B1 | 1/2003 | Huver et al. | |
| 6,534,177 | B2 | 3/2003 | Kohlhammer et al. | |
| 6,576,091 | B1 | 6/2003 | Cabell et al. | |
| 6,586,520 | B1 | 7/2003 | Canorro et al. | |
| 6,607,630 | B2 | 8/2003 | Bartman et al. | |
| 6,610,173 | B1 | 8/2003 | Lindsay et al. | |
| 6,660,362 | B1 | 12/2003 | Lindsay et al. | |
| 6,727,004 | B2 | 4/2004 | Goulet et al. | |
| 2002/0107495 | A1 * | 8/2002 | Chen et al. ................. | 604/365 |
| 2004/0007339 | A1 | 1/2004 | Tirimacco | |
| 2004/0031578 | A1 | 2/2004 | Tirimacco | |
| 2004/0099388 | A1 | 5/2004 | Chen et al. | |
| 2004/0118544 | A1 | 6/2004 | Tirimacco et al. | |
| 2004/0123963 | A1 | 7/2004 | Chen et al. | |
| 2005/0004309 | A1 | 1/2005 | Gerst et al. | |

FOREIGN PATENT DOCUMENTS

| | | | |
|---|---|---|---|
| DE | 43 05 727 | A1 | 9/1994 |
| EP | 0135231 | A1 * | 3/1985 |
| EP | 0140404 | A1 * | 5/1985 |
| EP | 0 549 925 | B1 | 8/1995 |
| EP | 0 694 578 | A2 | 1/1996 |
| EP | 0 661 030 | B1 | 7/2000 |
| EP | 1 180 559 | A1 | 2/2002 |
| EP | 1 082 391 | B1 | 6/2002 |
| EP | 1 316 432 | A1 | 6/2003 |
| GB | 2 006 296 | A | 5/1979 |
| GB | 2 303 647 | A | 2/1997 |
| WO | WO 92/16681 | A1 | 10/1992 |
| WO | WO 93/10732 | A1 | 6/1993 |
| WO | WO 97/44528 | A1 | 11/1997 |
| WO | WO 97/47227 | A1 | 12/1997 |
| WO | WO 9837274 | A1 * | 8/1998 |
| WO | WO 98/55695 | A1 | 12/1998 |
| WO | WO 9910597 | A1 * | 3/1999 |
| WO | WO 99/34057 | A1 | 7/1999 |
| WO | WO 99/34060 | A1 | 7/1999 |
| WO | WO 00/08077 | A1 | 2/2000 |
| WO | WO 00/66835 | A1 | 11/2000 |
| WO | WO 200102644 | A1 * | 1/2001 |
| WO | WO 02/29154 | A2 | 4/2002 |
| WO | WO 200241815 | A2 * | 5/2002 |
| WO | WO 2002/100032 | A1 | 12/2002 |
| WO | WO 2004/009905 | A1 | 1/2004 |
| WO | WO 2004/037935 | A1 | 5/2004 |

OTHER PUBLICATIONS

TAPPI Official Test Method T 402 om-93, “Standard Conditioning and Testing Atmospheres For Paper, Board, Pulp Handsheets, and Related Products,” published by the TAPPI Press, Atlanta, Georgia, revised 1993, pp. 1-3.

TAPPI Official Test Method T 411 om-89, “Thickness (Caliper) of Paper, Paperboard, and Combined Board,” published by the TAPPI Press, Atlanta, Georgia, revised 1989, pp. 1-3.

“Airflex 426 Emulsion,” Air Products Polymers, L.P., 2-page brochure and Internet web page “http://airproducts.com/polymers/controlled/product_description.asp?intRegionalMarketSegment=55...” printed Jul. 1, 2003, 2 pages and 1 page Specifications.

Blank, Werner J. et al., “Catalysis of the Epoxy-Carboxyl Reaction,” *International Waterborne, High-Solids and Powder Coatings Symposium*, New Orleans, LA, Feb. 21-23, 2001, Paper23_jct1.doc, printed Aug. 8, 2001, 18 pages.

Day, Dr. Richard, “Epoxy Resins,” Internet web page, “http://www2.umist.ac.uk/material/teaching/year2/ml260/epoxy.doc”, Feb. 26, 1998, viewed and printed Jul. 29, 2003, 10 pages.

DeVry, William E., “Latex Bonding Chemistry and Processes,” *Nonwovens An Advanced Tutorial*, edited by Albin F. Turbak and Tyrone L. Vigo, TAPPI Press, Atlanta, GA, 1989, Chapter 5, pp. 51-69.

Donnelly, R.H. and Martti Kangas, "Dryad Technology—Implementing Spraying Technology in Paper and Board Manufacturing," *Paperi ja Puu—Paper and Timber*, vol. 83, No. 7, 2001, pp. 530-531.
"Epoxy Resins," Internet web page, "http://sunilbhangale.tripod.com/epoxy.html", viewed and printed Jul. 29, 2003, pp. 1-4.
Espy, Herbert H., "Alkaline-Curing Polymeric Amine-Epichlorohydrin Resins," *Wet-Strength Resins and Their Application*, edited by Lock L. Chan, Chapter 2, TAPPI Press, Atlanta, GA, 1994, pp. 13-44.
"Glycidylic Ethers," KEMI, Internet web page, "http://www.kemi.se/kemamne_eng/glycidetrar_eng.htm", viewed and printed Jul. 29, 2003, pp. 1-2.
Moyer, W.W. Jr. and R.A. Stagg, "Miscellaneous Wet-Strength Agents," *Wet Strength in Paper and Paperboard*, TAPPI Monograph Series No. 29, Technical Association of the Pulp and Paper Industry, 1965, Mack Printing Company, Easton, PA, Chapter 8, pp. 105-125.
Oinonen, Hannu, "Metso Introduces New Coating Method: Spray for Light-Weight Coating," *Paperi ja Puu—Paper and Timber*, vol. 83, No. 7, 2001, pp. 526-528.
"Reactions of Epoxides," *Organic Chemistry 4e Carey Online Learning Center*, Chapter 16: Ethers, Epoxides and Sulfides, McGraw Hill, 2000, Internet web page, "http://www.mhhe.com/physsci/chemistry/carey/student/olc/ch16reactionsepoxides.html", viewed and printed Jul. 29, 2003, pp. 1-4.
Sabia, A.J. and R.B. Metzler, "The Role of Silicones In Woven and Nonwoven Fabric Applications," *Advances in Nonwoven Technology—Tenth Technical Symposium*, Inda, Association of the Nonwoven Fabrics Industry, New York, Nov. 17-19, 1982, pp. 284-293.
Zhao, Yaqiu and Marek W. Urban, "Novel STY/nBA/GMA and STY/nBA/MAA Core—Shell Latex Blends: Film Formation, Particle Morphology, and Cross-Linking. 20. A Spectroscopic Study," *Macromolecules*, vol. 33, No. 22, 2000, pp. 8426-8434.
Patent Cooperation Treaty Search Report from the International Search Authority, International Application No. PCT/US 2004/006008 dated Aug. 25, 2004.
American Society for Testing Materials (ASTM) Designation: D5170-98, "Standard Test Method for Peel Strength ("T" Method) of Hook and Loop Touch Fasteners," pp. 702-704, published Mar. 1999.

* cited by examiner

CLOTHLIKE PATTERN DENSIFIED WEB

BACKGROUND OF THE INVENTION

The general demand for disposable paper products has created a demand for improved versions of the products and of the methods of their manufacture. Despite great strides in paper making, research and development efforts continue to be aimed at improving both the products and their processes of manufacture. Disposable products such as paper towels, facial tissues, sanitary tissues, and the like are made from one or more webs of tissue paper. If the products are to perform their intended tasks and to find wide acceptance, they, and the tissue paper webs from which they are made, must exhibit certain physical characteristics. Among the more important of these characteristics are strength, softness, and absorbency. Strength relates to the ability of a paper web to retain its physical integrity during use. Softness is the pleasing tactile sensation the user perceives as he contacts various portions of his anatomy with it. Absorbency is the characteristic of the paper which allows it to take up and retain fluids, particularly water and aqueous solutions and suspensions. Important not only is the absolute quantity of fluid a given amount of paper will hold, but also the rate at which the paper will absorb the fluid. When the paper is formed into a product such as a towel or wipe, the ability of the paper to cause a fluid to preferentially be taken up into the paper and thereby leave a wiped surface dry is also important. Despite the numerous high quality tissue products available, the search for improved products continues. The present invention is an improvement in the process used to make tissue and the resulting tissue made,

SUMMARY OF THE INVENTION

This invention is an improved paper and the process by which the improved paper is made using papermaking fabrics comprising deflection conduits. The improved paper of this invention is characterized as having two regions; one is a network (or open grid) region, the other is a plurality of domes. (The domes appear to be protuberances when viewed from one surface of the paper and cavities when viewed from the opposite surface.) The network need not be continuous throughout the paper web but may exist in selected regions to define one or more domes. A paper web may comprise multiple regions comprising a network surrounding one or more domes, and the multiple regions may form a pattern. In some embodiments, the network is continuous throughout a web of paper, and is macroscopically monoplanar, and forms a preselected pattern. It completely encircles the domes and isolates one dome from another. The domes are generally dispersed throughout the network region. In one embodiment, the network region can have a relatively low basis weight and a relative high density, while the domes can have relatively high basis weights and relatively low densities. In other embodiments, the basis weight of the domes may be substantially the same as the basis weight of the network or may be greater than that of the network, or may vary throughout the web, as may the basis weight of the network. Typically, the domes exhibit relatively low intrinsic strength while the network region exhibits relatively high intrinsic strength. At least a portion of either region of the paper web has a bonding material that penetrates at least a portion of the thickness of the paper web.

The improved paper of this invention exhibits good absorbency, softness, tensile strength, burst strength, bulk (apparent density) and, depending on the preselected pattern of the network region, the ability to stretch in the machine direction, in the cross machine direction, and in intermediate directions even in the absence of creping. Additionally, the paper of this invention can have controlled “wet-out” properties and an improved wet/dry tensile ratio due to the bonding material applied to the web. The improved paper of this invention can, once again depending on the pattern of the network region, take on a clothlike appearance and character. The paper webs of the present invention are useful in the manufacture of numerous products such as paper towels, sanitary tissues, facial tissues, napkins, wipers, and the like. They are also useful in other applications where nonwoven fabrics currently find utility.

DETAILED DESCRIPTION OF THE INVENTION

The Process

Figure 1:
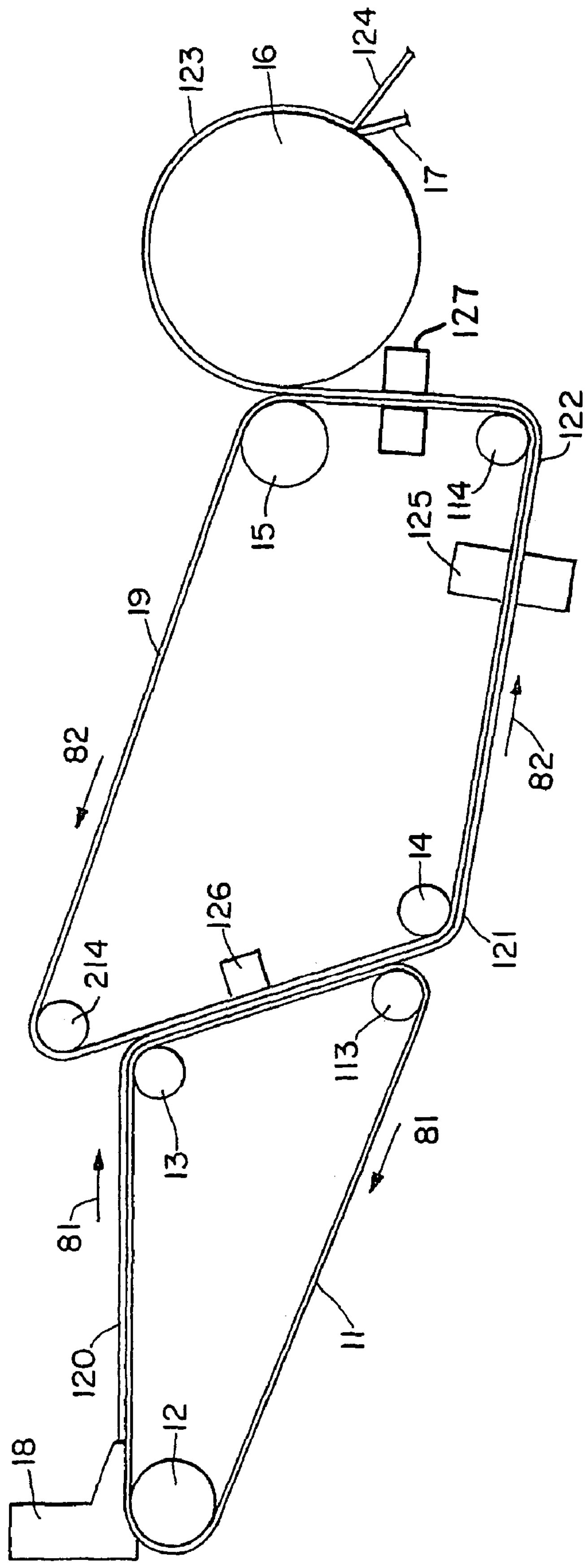
FIG. 1 is a schematic representation of one embodiment of a continuous papermaking machine useful in the practice of the present invention.

The process of the invention comprises a number of steps or operations. Each step will be discussed in detail in the following paragraphs. It is not necessary for each step to follow the proceeding step. For instance, the application of the bonding material as discussed in step six (6) can occur earlier or later in the listed sequence. Other steps may be added to the process, or steps may be deleted from the process as disclosed in the incorporated references. For instance, an air-laid cellulosic web can be used rather than an aqueous dispersion of paper making fibers.

First Step

The first step in the practice of this invention can be the providing of an aqueous dispersion of papermaking fibers. Papermaking fibers useful in the present invention include those cellulosic fibers commonly known as wood pulp fibers. Fibers derived from soft woods (gymnosperms or coniferous trees) and hard woods (angiosperms or deciduous trees) are contemplated for use in this invention. The particular species of tree from which the fibers are derived is immaterial.

The wood pulp fibers can be produced from the native wood by any convenient pulping process. Chemical processes such as sulfite, sulphate (including the kraft) and soda processes are suitable. Mechanical processes such as thermo-mechanical (or Asplund) processes are also suitable. In addition, the various semi-chemical and chemi-mechanical processes can be used. Bleached as well as unbleached fibers are contemplated for use. When the paper web of this invention is intended for use in absorbent products such as paper towels, bleached northern softwood kraft pulp fibers are preferred.

In addition to the various wood pulp fibers, other cellulosic fibers such as cotton, rayon, and bagasse can be used in this invention. Synthetic fibers such as polyester and polyolefin fibers can also be used.

In one embodiment, the embryonic web (which is hereinafter defined) is prepared from an aqueous dispersion of the papermaking fibers. Fluids other than water can be used to disperse the fibers prior to their formation into an embryonic web.

Any equipment commonly used in the art for dispersing fibers can be used. The fibers are normally dispersed at a consistency of from about 0.1% to about 0.3% at the time an embryonic web is formed.

In this specification, the moisture content of various dispersions, webs, and the like is expressed in terms of percent consistency. Percent consistency is defined as 100 times the quotient obtained when the weight of dry fiber in the system under discussion is divided by the total weight of the system. An alternate method of expressing moisture content of a system sometimes used in the papermaking art is pounds of water per pound of fiber or, alternatively and equivalently, kilograms of water per kilogram of fiber. The correlation between the two methods of expressing moisture content can be readily developed. For example, a web having a consistency of 25% comprises 3 kilograms of water per kilogram of fiber, and a consistency of 50% comprises 1 kilogram of water per kilogram of fiber. Fiber weight is always expressed on the basis of bone dry fibers.

In addition to papermaking fibers, the embryonic web formed during the practice of this invention and the dispersion from which the web is formed can include various additives commonly used in papermaking. Examples of useful additives include wet strength agents such as urea-formaldehyde resins, melamine formaldehyde resins, polyamide-epichlorohydrin resins, polyethyleneimine resins, polyacrylamide resins, and dialdehyde starches. Dry strength additives include all chemistries capable of forming hydrogen bonds with cellulose. These dry strength additives may include modified starches and gums, modified cellulose polymers, and synthetic polymers including modified polyacrylamide polymers. Complete descriptions of useful wet strength agents can be found in Tappi Monograph Series No. 29, *Wet Strength in Paper and Paperboard*, Technical Association of Pulp and Paper Industry (TAPPI, New York, 1965), and in TAPPI Committee Assignment No. 810506.03, *Wet-Strength Resins and Their Application* (TAPPI Press 1994), both incorporated herein by reference and in other common references. Dry strength additives are described more fully in U.S. Pat. No. 3,660,338 issued to Economou on May 2, 1972, also incorporated herein by reference. The levels at which these materials are useful in paper webs is also described in the noted references.

Other useful additives include debonders which increase the softness of the paper webs. Specific debonders that can be used in the present invention include quaternary ammonium compounds such as ditallow-dimethyl ammonium chloride and bis(alkoxy-(2-hydroxy)propylene) quaternary ammonium compounds. U.S. Pat. No. 3,554,863 issued to Hervey et al. on Jan. 12, 1971 and U.S. Pat. No. 4,144,122 issued to Emanuelsson et al. on Mar. 13, 1979, and U.S. Pat. No. 4,351,699 issued to Osborn, III on Sep. 28, 1982, all incorporated herein by reference, more fully discuss debonders.

In addition, those pigments, dyes, fluorescers, and the like commonly used in paper products can be incorporated in the dispersion.

Second Step

The second step in the practice of this invention can be forming an embryonic web of papermaking fibers on a first foraminous member from the aqueous dispersion provided in the first step. Alternatively, an air-laid embryonic web can be formed on the foraminous member.

As used in this specification, an embryonic web is that web of fibers which is, during the course of the practice of this invention, subjected to rearrangement on the deflection member hereinafter described. As more fully discussed hereinafter, the embryonic web can be formed from the aqueous dispersion of papermaking fibers by depositing that dispersion onto a foraminous surface and removing a portion of the aqueous dispersing medium. The fibers in the embryonic web can have a relatively large quantity of water associated with them; consistencies in the range of from about 5% to about 25% are common. Normally, an embryonic web is too weak to be capable of existing without the support of an extraneous element such as a Fourdrinier wire. Regardless of the technique by which an embryonic web is formed, at the time it is subjected to rearrangement on the deflection member it must be weak enough to permit rearrangement of the fibers under the action of the forces hereinafter described.

Any of the numerous techniques well known to those skilled in the papermaking art can be used to form an embryonic web. The precise method by which the embryonic web is formed is immaterial to the practice of this invention so long as the embryonic web possesses the characteristics discussed above. As a practical matter, continuous papermaking processes are preferred, even though batch process, such as hand sheet making processes, can be used. Processes which lend themselves to the practice of this step are described in many references such as U.S. Pat. No. 3,301,746 issued to Sanford and Sisson on Jan. 31, 1974, and U.S. Pat. No. 3,994,771 issued to Morgan and Rich on Nov. 30, 1976, both incorporated herein by reference.

FIG. 1 is a simplified, schematic representation of a non-limiting embodiment of a continuous papermaking machine useful in the practice of the present invention. An aqueous dispersion of papermaking fibers prepared in equipment not shown can be provided to headbox 18, which can be of any convenient design. From headbox 18, the aqueous dispersion of papermaking fibers is delivered to a first foraminous member 11 which is typically a Fourdrinier wire.

First foraminous member 11 is supported by breast roll 12 and a plurality of return rolls of which only two, 13 and 113, are illustrated. First foraminous member 11 is propelled in the direction indicated by directional arrow 81 by drive means not shown. Optional auxiliary units and devices commonly associated with papermaking machines and with first foraminous member 11, but not shown in FIG. 1, include forming boards, hydrofoils, vacuum boxes, tension rolls, support rolls, wire cleaning showers, and the like.

The purpose of headbox 18 and first foraminous member 11, and the various auxiliary units and devices, illustrated and not illustrated, is to form an embryonic web of papermaking fibers. After the aqueous dispersion of papermaking fibers is deposited onto first foraminous member 11, embryonic web 120 is formed by removal of a portion of the aqueous dispersing medium by techniques well known to those skilled in the art. Vacuum boxes, forming boards, hydrofoils, and the like are useful in effecting water removal. Embryonic web 120 travels with first foraminous member 11 about return roll 13 and is brought into the proximity of a second foraminous member which has the characteristics described below.

Third Step

The third step in the process of this invention can be associating the embryonic web with the second foraminous member that is sometimes referred to as a "deflection member." The purpose of this third step is to bring the embryonic web into contact with the deflection member on which it will be subsequently deflected, rearranged, and further dewatered.

In the embodiment illustrated in FIG. 1, the deflection member takes the form of an endless belt, deflection member 19. In this simplified representation, deflection member 19 passes around and about deflection member return rolls 14, 114, and 214 and impression nip roll 15 and travels in the direction indicated by directional arrow 82. Associated with deflection member 19, but not shown in FIG. 1, are various support rolls, return rolls, cleaning means, drive means, and the like commonly used in papermaking machines and all well known to those skilled in the art.

Regardless of the physical form that the deflection member takes, whether it be an endless belt as just discussed or some other embodiment such as a stationary plate for use in making hand sheets or a rotating drum for use with other types of continuous processes, it must have certain physical characteristics.

First, the deflection member must be foraminous. That is to say, it must possess continuous passages connecting its first surface (or "upper surface" or "working surface"; i.e. the surface with which the embryonic web is associated, sometimes referred to as the "embryonic web-contacting surface") with its second surface (or "lower surface"). Stated in another way, the deflection member must be constructed in such a manner that when water is caused to be removed from the embryonic web, as by the application of differential fluid pressure, and when the water is removed from the embryonic web in the direction of the foraminous member, the water can be discharged from the system without having to again contact the embryonic web in either the liquid or the vapor state. However, in the case of an air-laid web, it is not necessary that any water actually be removed from the embryonic web as long as the fibers of the embryonic web are molded or rearranged by the deflection member such as by application of vacuum to the continuous passages.

Second, the embryonic web-contacting surface of the deflection member can comprise a macroscopically monoplanar, patterned, continuous network surface. This network surface defines within the deflection member a plurality of discrete, isolated, deflection conduits.

The network surface may be described, in some embodiments, as being "macroscopically monoplanar." As indicated above, the deflection member may take a variety of configurations such as belts, drums, flat plates, and the like. When a portion of the embryonic web-contacting surface of the deflection member is placed into a planar configuration, the network surface is essentially monoplanar. It is said to be "essentially" monoplanar to recognize the fact that deviations from absolute planarity are tolerable, but not preferred, so long as the deviations are not substantial enough to adversely affect the performance of the product formed on the deflection member. A network surface is said to be "continuous" in certain embodiments when the lines formed by the network surface form at least one essentially unbroken net-like pattern. A pattern is said to be "essentially" continuous to recognize the fact that interruptions in the pattern are tolerable, but not preferred, so long as the interruptions are not substantial enough to adversely affect the performance of the product made on the deflection member.

Figure 2:
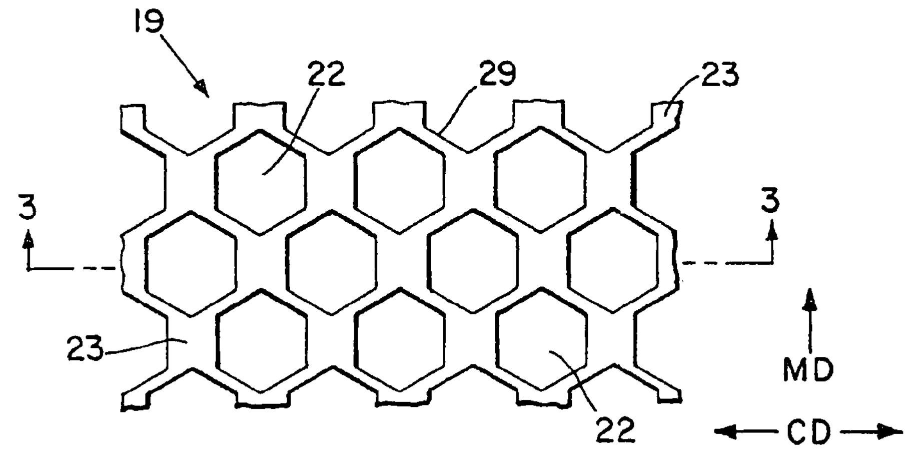
FIG. 2 is a plan view of a portion of a deflection member.

FIG. 2 is a simplified representation of a portion of deflection member 19. In this plan view, macroscopically monoplanar, patterned, continuous network surface 23 (for convenience, usually referred to as "network surface 23") is illustrated. Network surface 23 is shown to define deflection conduits 22. In this simplified representation, network surface 23 defines deflection conduits 22 in the form of hexagons in a bilaterally staggered array. It is to be understood that network surface 23 can be provided with a variety of patterns having various shapes, sizes, and orientations as will be more fully discussed hereinafter. Deflection conduits 22 will, then, also take on a variety of configurations.

Figure 3:
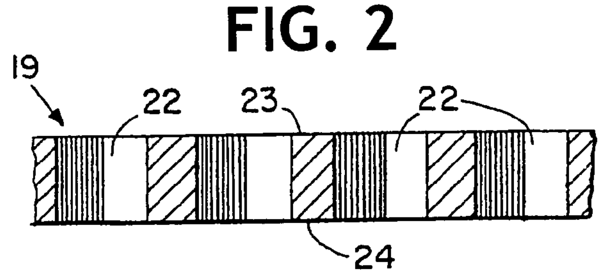
FIG. 3 is a cross sectional view of a portion of the deflection member shown in FIG. 2 as taken along line 3—3.

FIG. 3 is a cross sectional view of that portion of deflection member 19 shown in FIG. 2 as taken along line 3—3 of FIG. 2. FIG. 3 clearly illustrates the fact that deflection member 19 is foraminous in that deflection conduits 22 extend through the entire thickness of deflection member 19 and provide the necessary continuous passages connecting its two surfaces as mentioned above. Deflection member 19 is shown to have a bottom surface 24.

As illustrated in FIGS. 2 and 3, deflection conduits 22 are shown to be discrete. That is, they have a finite shape that depends on the pattern selected for network surface 23 and are separated one from another. Stated in still other words, deflection conduits 22 are discretely perimetrically enclosed by network surface 23. This separation is particularly evident in the plan view. They are also shown to be isolated in that there is no connection within the body of the deflection member between one deflection conduit and another. The isolation one from another is particularly evident in the cross-section view. Thus, transfer of material from one deflection conduit to another is not possible unless the transfer is affected outside the body of the deflection member.

An infinite variety of geometries for the network surface and the openings of the deflection conduits are possible. The following discussion is concerned entirely with the geometry of the network surface (i.e. 23) and the geometry of the openings (i.e. 29) of the deflection conduits in the plane of the network surface.

First, it must be recognized that the surface of the deflection member comprises two distinct regions: the network surface 23 and the openings 29 of the deflection conduits. Selection of the parameters describing one region will necessarily establish the parameters of the other region. That is to say, since the network surface defines within it the deflection conduits, the specification of the relative directions, orientations, and widths of each element or branch of the network surface will of necessity define the geometry and distribution of the openings of the deflection conduits.

Conversely, specification of the geometry and distribution of the openings of the deflection conduits will of necessity define the relative directions, orientations, widths, etc. of each branch of the network surface.

For convenience, the surface of the deflection member will be discussed in terms of the geometry and distribution of the openings of the deflection conduits. (As a matter of strict accuracy, the openings of the deflection conduits in the surface of the deflection member are, naturally, voids. While there may be certain philosophical problems inherent in discussing the geometry of nothingness, as a practical matter those skilled in the art can readily understand and accept the concept of an opening—a hole, as it were—having a size and a shape and a distribution relative to other openings.)

While the openings of the deflection conduit can be of random shape and in random distribution, they preferably are uniform shape and are distributed in a repeating, preselected pattern. Practical shapes include circles, ovals, and polygons of six or fewer sides. There is no requirement that the openings of the deflection conduits be regular polygons or that the sides of the openings be straight; openings with curved sides, such as trilobal figures, can be used. In one embodiment, the openings comprise the nonregular six-sided polygon illustrated in FIG. 10.

Figure 10:
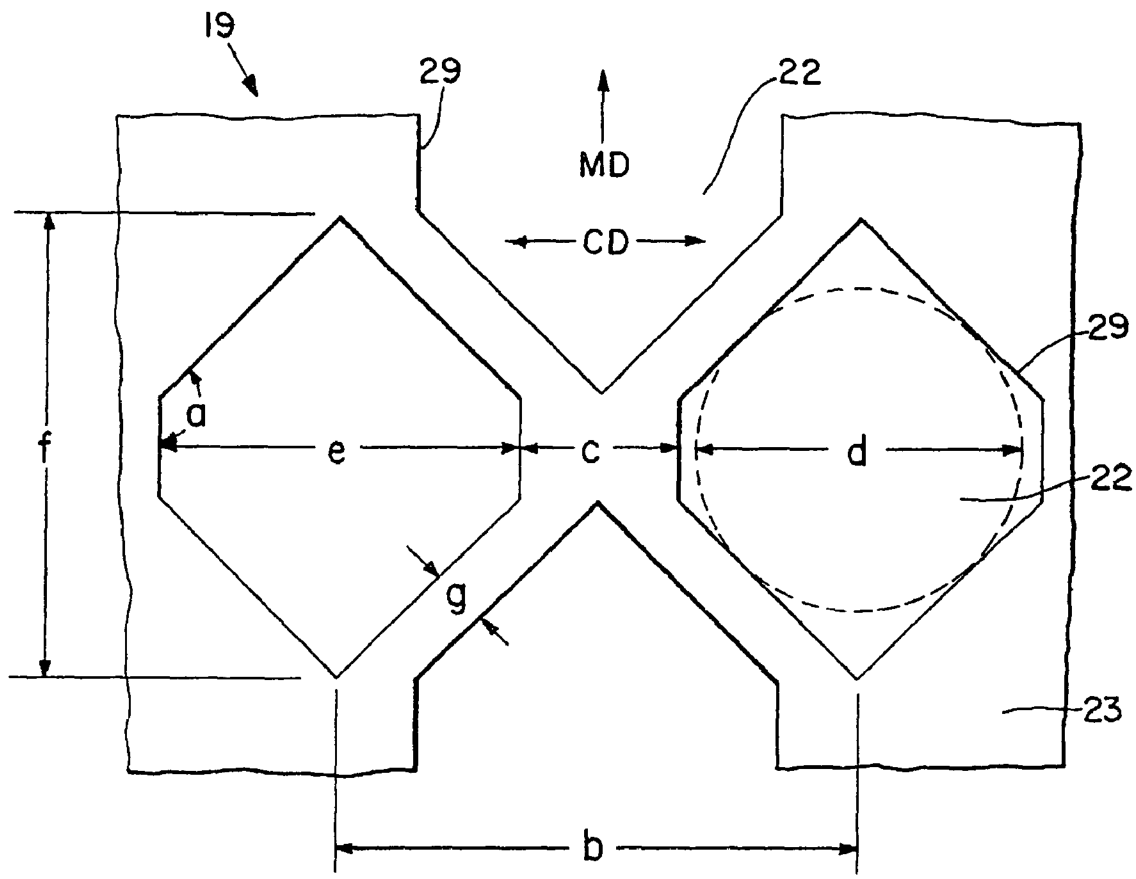
FIG. 10 is a schematic representation of a deflection conduit opening geometry.

FIG. 10 is a schematic representation of one geometry of the openings of the deflection conduits (and, naturally, of the network surface). Only a portion of simple deflection member 19 showing a repeating pattern (unit cell) is shown. Deflection conduits 22 having openings 29 are separated by network surface 23. Openings 29 are in the form of non-regular six-sided figures. Reference letter "a" represents the angle between the two sides of an opening as illustrated, "f" the point-to-point height of an opening, "c" the CD spacing between adjacent openings, "d" the diameter of the largest circle which can be inscribed in an opening, "e" the width between flats of an opening, "g" the spacing between two adjacent openings in a direction intermediate MD and CD, and "b" the shortest distance (in either MD or CD) between the centerlines of two MD or CD adjacent openings. In one embodiment, which can be used with northern softwood kraft furnishes, "a" is 135°, "c" is 0.56 millimeter (0.022 inch), "e" is 1.27 mm (0.050 in.), "f" is 1.62 mm (0.064 in.), "g" is 0.20 mm (0.008 in.) and the ratio of "d" to "b" is 0.63. A deflection member constructed to this geometry has an open area of about 69%. These dimensions can be varied proportionally for use with other furnishes.

In one embodiment, the spacing is a regular, repeating distribution of the openings of the deflection conduits such as regularly and evenly spaced openings in aligned ranks and files. In another embodiment, the openings are regularly spaced in regularly spaced ranks wherein the openings in adjacent ranks are offset one from another. In another embodiment, the opening can comprise a bilaterally staggered array of openings as illustrated in FIG. 2. It can be seen that the deflection conduits are sufficiently closely spaced that the machine direction (MD) span (or length) of the opening 29 of any deflection conduit (the reference opening) completely spans the MD space intermediate a longitudinally (MD) spaced pair of openings, which latter pair is disposed laterally adjacent the reference opening. Further, the deflection conduits are also sufficiently closely spaced that the cross machine direction (CD) span (or width) of the opening 29 of any deflection conduit (the reference opening) completely spans the CD space intermediate a laterally (CD) spaced pair of openings, which latter pair is disposed longitudinally adjacent the reference opening. Stated in perhaps simpler terms, the openings of the deflection conduits are of sufficient size and spacing that, in any direction, the edges of the openings extend past one another.

In papermaking, directions are normally stated relative to machine direction (MD) or cross machine direction (CD). Machine direction refers to that direction which is parallel to the flow of the web through the equipment. Cross machine direction is perpendicular to the machine direction. These directions are indicated in FIGS. 2, 4, and 10.

Figure 4:
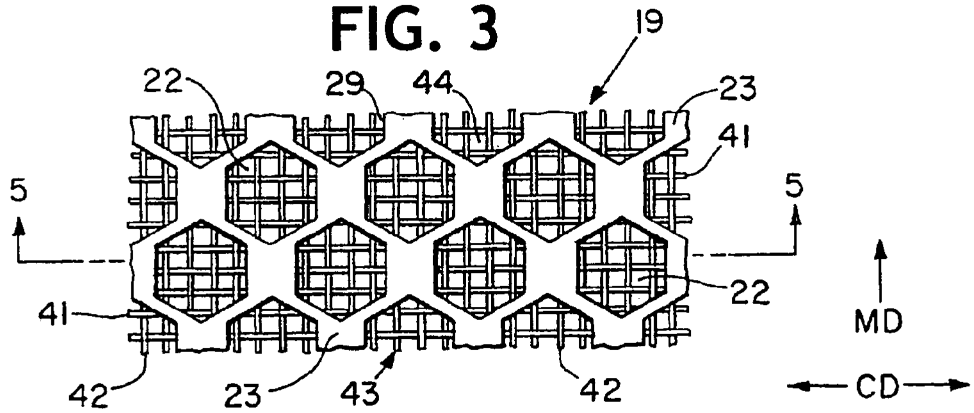
FIG. 4 is a plan view of an alternate embodiment of a deflection member.
Figure 5:
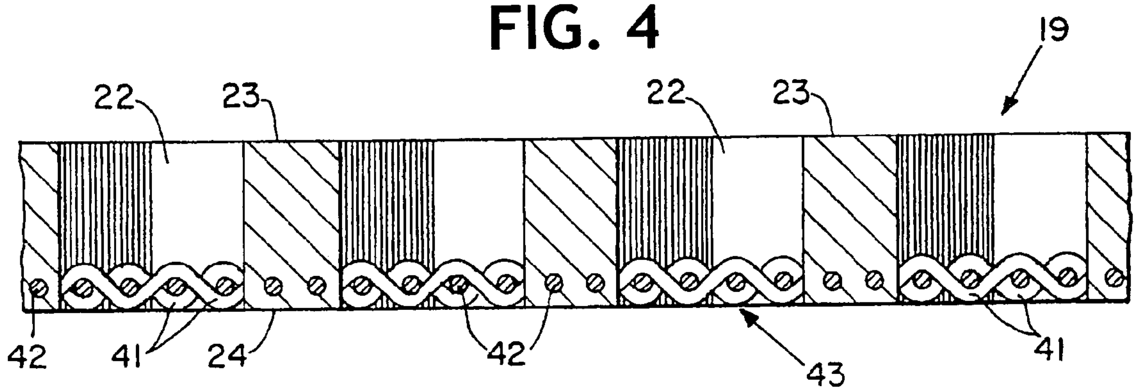
FIG. 5 is a cross sectional view of a portion of the deflection member shown in FIG. 4 as taken along line 5—5.

FIGS. 4 and 5 are analogous to FIGS. 2 and 3, but illustrate another embodiment for the deflection member. FIG. 4 illustrates in plan view a portion of deflection member 19. Network surface 23 defines openings 29 of the deflection conduits 22 as hexagons in bilaterally staggered array, but it is to be understood that, as before, a variety of shapes and orientations can be used. FIG. 5 illustrates a cross sectional view of that portion of deflection member 19 shown in FIG. 4 as taken along line 5—5. Machine direction reinforcing strands 42 and cross direction reinforcing strands 41 are shown in both FIGS. 4 and 5. Together machine direction reinforcing strands 42 and cross direction reinforcing strands 41 combine to form foraminous woven element 43. One purpose of the reinforcing strands is to strengthen the deflection member. As shown, reinforcing strands 41 and 42 are round and are provided as a square weave fabric around which the deflection member has been constructed. Any convenient filament size and shape in any convenient weave can be used as long as flow through the deflection conduits is not significantly hampered during web processing and so long as the integrity of the deflection member as a whole is maintained. The material of construction is immaterial; in one embodiment polyester is used.

An examination of the deflection member illustrated in FIG. 4 will reveal that there are actually two distinct types of openings (or foramina) in the deflection member. The first is the opening 29 of the deflection conduit 22, the geometry of which was discussed immediately above; the second type comprises the interstices between strands 41 and 42 in woven foraminous element 43. These latter openings are referred to as fine foramina 44. To emphasize the distinction, the openings 29 of the deflection conduits 22 are sometimes referred to as gross foramina.

Thus far, little has been written about the geometry of the network surface per se. It is readily apparent, especially from an examination of FIG. 2, that the network surface will comprise a series of intersecting lines of various lengths, orientations, and widths all dependent on the particular geometry and distribution selected for the openings 29 of the deflection conduits. It is to be understood that it is the combination and interrelation of the two geometries which influence the properties of the paper web of this invention. It is also to be understood that interactions between various fiber parameters (including length, shape, and orientation in the embryonic web) and network surface and deflection conduit geometries influence the properties of the paper web.

As mentioned above, there are an infinite variety of possible geometries for the network surface and the openings of the deflection conduits. Certain broad guidelines for selecting a particular geometry can be stated. First, regularly shaped and regularly organized gross foramina are important in controlling the physical properties of the final paper web. The more random the organization and the more complex the geometry of the gross foramina, the greater is their effect on the appearance attributes of a web. The maximum possible staggering of the gross foramina tends to produce isotropic paper webs. If anisotropic paper webs are desired, the degree of staggering of the gross foramina should be reduced.

Second, for most purposes, the open area of the deflection member (as measured solely by the open area of the gross foramina) should be from about 35% to about 85%. The actual dimensions of the gross foramina (in the plane of the surface of the deflection member) can be expressed in terms of effective free span. Effective free span is defined as the area of the opening of the deflection conduit in the plane of the surface of the deflection member (i.e. the area of a gross foramina) divided by one-fourth of the perimeter of the gross foramina. Effective free span, for most purposes, should be from about 0.25 to about 3.0 times the average length of the papermaking fibers used in the process, preferably from about 0.35 to about 2.0 times the fiber length.

In order to form paper webs having the greatest possible strength, it is desirable that localized stresses within the web be minimized. The relative geometries of the network surface and the gross foramina have an effect on this minimization. For simple geometries (such as circles, triangles, hexagons, etc.), the ratio of the diameter of the largest circle which can be inscribed within the gross foramina ("d") to the shortest distance (in either MD or CD) between central lines of neighboring gross foramina ("b") should be between about 0.45 and about 0.95.

The third fact to be considered is the relative orientation of the fibers in the embryonic web, the overall direction of the geometries of the network surfaces and the gross foramina, and the type and direction of foreshortening (as the latter is hereinafter discussed). Since the fibers in the embryonic web generally possess a distinct orientation, which can depend on the operating parameters of the system used to form the embryonic web, the interaction of this fiber orientation with the orientation of the network surface geometry will have an effect on web properties. In the usual foreshortening operation, i.e. during creping, the doctor blade is oriented in the cross machine direction. Thus, the orientation of the geometries of the network surface and the gross foramina relative to the doctor blade strongly influence the nature of the crepe and, hence, the nature of the paper web.

As discussed thus far, the network surface and deflection conduits have single coherent geometries. Two or more geometries can be superimposed one on the other to create webs having different physical and aesthetic properties. For example, the deflection member can comprise first deflection conduits having openings described by a certain shape in a certain pattern and defining a monoplanar first network surface all as discussed above. A second network surface can be superimposed on the first. This second network surface can be coplanar with the first and can itself define second conduits of such a size as to include within their ambit one or more whole or fractional first conduits. Deflection members having more than one network surface are disclosed in U.S. Pat. No. 6,576,091 issued to Cabell on Jun. 10, 2003 and herein incorporated by reference.

Alternatively, the second network surface can be noncoplanar with the first. In further variations, the second network surface can itself be nonplanar. In still further variations, the second (the superimposed) network surface can merely describe open or closed figures and not actually be a network at all; it can, in this instance, be either coplanar or noncoplanar with the first network surface. It is expected that these latter variations (in which the second network surface does not actually form a network) will be most useful in providing aesthetic character to the paper web. As before, an infinite number of geometries and combinations of geometries are possible.

As indicated above, deflection member 19 can take a variety of forms. The method of construction of the deflection member is immaterial so long as it has the characteristics mentioned above.

In one embodiment, the deflection member is an endless belt which can be constructed by, among other methods, a method adapted from techniques used to make stencil screens. By "adapted" it is meant that the broad, overall techniques of making stencil screens are used, but improvements, refinements, and modifications as discussed below are used to make members having significantly greater thickness than the usual stencil screen. Broadly, a foraminous element (such as foraminous woven element 43 in FIGS. 4 and 5) is thoroughly coated with a liquid photosensitive polymeric resin to a preselected thickness. A mask or negative incorporating the pattern of the preselected network surface is juxtaposed with the liquid photosensitive resin; the resin is then exposed to light of an appropriate wave length through the mask. This exposure to light causes curing of the resin in the exposed areas. Unexposed (and uncured) resin is removed from the system leaving behind the cured resin forming the network surface defining within it a plurality of discreet, isolated deflection conduits. Additional information pertaining to the construction of a suitable deflection member is disclosed in U.S. Pat. No. 4,528,239 issued to Trokhan on Jul. 9, 1985 and herein incorporated by reference. Further deflection members are disclosed in U.S. patent application Ser. No. 09/705684, "Deflection Members for Tissue Production," by Lindsay et al., filed Nov. 3, 2000, and U.S. patent application Ser. No. 09/706149, "Three-Dimensional Tissue and Methods for Making the Same" by Lindsay et al., also filed Nov. 3, 2000, both of which are herein incorporated by reference. The applications disclose deflection members and deflection conduits having asymmetric profiles, as well as related papermaking fabrics comprising photocured elements cured without actinic radiation.

Photocuring may be done in two or more steps, or with light applied at two or more angles, to create more complex structures such as fabrics with asymmetric profiles, or two or more resin compositions disposed in two or more patterns, or fabrics with two or more layers of photocured resins. Fabrics may also be made according to U.S. Pat. No. 6,193,847, "Papermaking Belts Having a Patterned Framework with Synclines Therein," issued Feb. 27, 2001 to Trokhan.

Fourth Step

The fourth step in the process of this invention can be deflecting the fibers in the embryonic web into the deflection conduits and removing water from the embryonic web, as by the application of differential fluid pressure to the embryonic web, to form an intermediate web of papermaking fibers. The deflecting can be effected under such conditions that there is essentially no water removal from the embryonic web through the deflection conduits after the embryonic web has been associated with the deflection member prior to the deflecting of the fibers into the deflection conduits.

Figure 6:
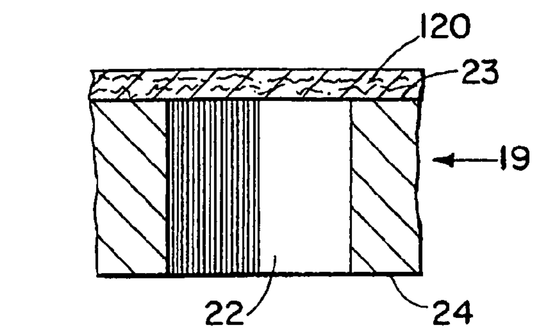
FIG. 6 is a simplified representation in cross section of a portion of an embryonic web in contact with a deflection member.
Figure 7:
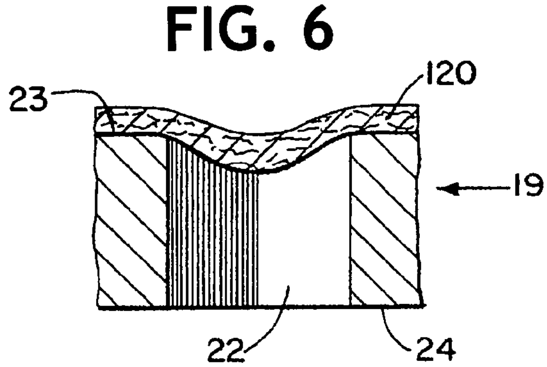
FIG. 7 is a simplified representation of a portion of an embryonic web in contact with a deflection member after the fibers of the embryonic web have been deflected into a deflection conduit of the deflecting member.

Deflection of the fibers into the deflection conduits is illustrated in FIGS. 6 and 7. FIG. 6 is a simplified representation of a cross section of a portion of deflection member 19 and embryonic web 120 after embryonic web 120 has been associated with deflection member 19, but before the deflection of the fibers into deflection conduits 22 as by the application thereto of differential fluid pressure. In FIG. 6, only one deflection conduit 22 is shown; the embryonic web is associated with network surface 23.

FIG. 7, as FIG. 6, is a simplified cross sectional view of a portion of deflection member 19. This view, however, illustrates embryonic web 120 after its fibers have been deflected into deflection conduit 22 as by the application of differential fluid pressure. It is to be observed that a substantial portion of the fibers in embryonic web 120 and, thus, embryonic web 120 itself, has been displaced below network surface 23 and into deflection conduit 22. Rearrangement of the fibers in embryonic web 120 (not shown) occurs during deflection and water is removed through deflection conduit 22 as discussed more fully hereinafter.

Deflection of the fibers in embryonic web 120 into deflection conduits 22 is induced by, for example, the application of differential fluid pressure to the embryonic web. One preferred method of applying differential fluid pressure is by exposing the embryonic web to a vacuum in such a way that the web is exposed to the vacuum through deflection conduit 22 as by application of a vacuum to deflection member 19 on the side designated bottom surface 24.

In FIG. 1, this preferred method is illustrated by the use of vacuum box 126. Optionally, positive pressure in the form of air or steam pressure can be applied to embryonic web 120 in the vicinity of vacuum box 126 through first foraminous member 11. Means for optional pressure application are not shown in FIG. 1.

In other embodiments, the embryonic web 120 may also be contacted with a flexible low-permeability web (not shown) having an air permeability less than the air permeability of the underlying deflection member 19 on which the web is disposed. The embryonic web 120 is overlaid with the flexible web and exposed to an air pressure gradient such that the flexible web deflects toward the underlying deflection member 120 and further promotes water removal from the paper web or molding of the paper web. The flexible low-permeability web can have a degree of surface texture which can be imparted to the upper surface of the embryonic web 120 during pressing or application of air pressure differentials. Principles for the use of a flexible web against a paper surface on a deflection member are disclosed by P. D. Trokhan and V. Vitenberg in U.S. Pat. No. 5,893,965, issued Apr. 13, 1999.

Association of the embryonic web with the deflection member (the third step of the process of this invention) and the deflecting of the fibers in the embryonic web into the deflection conduits (the first portion of the fourth step of this invention) can be accomplished essentially simultaneously through the use of a technique analogous to the wet-microcontraction process used in papermaking. In accordance with this aspect of the invention, the embryonic web of papermaking fibers is formed on the first foraminous member as in the second step of this invention described above. During the process of forming the embryonic web, sufficient water is noncompressively removed from the embryonic web before it reaches a transfer zone so that the consistency of the embryonic web is from about 10% to about 30%. The transfer zone is that location within the papermaking machine at which the embryonic web is transferred from the first foraminous member to the deflection member.

In the practice of this embodiment of the invention, the deflection member is preferably a flexible, endless belt which, at the transfer zone, is caused to traverse a convexly curved transfer head. The function of the transfer head is merely to hold the deflection member in an arcuate shape. Optionally, the transfer head is so constructed as to also serve as a means for applying vacuum to the bottom surface of the deflection member thereby aiding in the transfer of the embryonic web. While the deflection member is traversing the transfer head, the first foraminous member is caused to converge with the deflection member and then to diverge therefrom at sufficiently small acute angles that compaction of the embryonic web interposed between the two is substantially obviated. Optionally, in the transfer zone, a sufficient differential fluid pressure (induced by vacuum applied through the transfer head) is applied to the embryonic web to cause it to transfer from the first foraminous member to the deflection member without substantial compaction (i.e. without a substantial increase in its density).

In some embodiments, at the point where the first foraminous member and the deflection member are brought into juxtaposition, there may be a differential velocity between the two members. In general, for such embodiments, the first foraminous member may be traveling at a velocity of from about 7% to about 30% faster than the deflection member. Transferring the embryonic web from the first foraminous member to the deflection member causes the papermaking fibers in the embryonic web to be deflected into the deflection conduits even in the absence of differential fluid pressure. Differential fluid pressure, of course, enhances the deflection and initiates further dewatering as hereinafter described. Thus, in some embodiments, the transfer of the web from the first foraminous member 11 to the deflection member 19, or in general between any fabric to a successive fabric, may occur with a degree of differential velocity, wherein the web travels at a slower velocity after the transfer. In other words, a "rush transfer" operation is executed in a transfer zone wherein the deflection member travels more slowly than the first foraminous member 11, or wherein a first fabric travels more rapidly than an immediately following successive fabric, such that the web experiences foreshortening during the transfer. Details of such rush transfer operations are disclosed in U.S. Pat. No. 4,440,597, "Wet-Microcontracted Paper and Concomitant Process," issued Apr. 3, 1984 to Wells et al.; U.S. Pat. No. 5,667,636, "Method for Making Smooth Uncreped Throughdried Sheets," issued Sep. 16, 1997 to Engel et al.; and U.S. Pat. No. 5,830,321, "Method for Improved Rush Transfer to Produce High Bulk Without Macrofolds," issued Nov. 3, 1998 to Lindsay and Chen. As disclosed in U.S. patent application Ser. No. 09/705684 by Lindsay et al., filed Nov. 3, 2000, the combination of rush transfer with the use of a foraminous member comprising deflection conduits, or other forms of shear applied to a web on a deflection member, can result in asymmetric domes in the paper web even when the deflection members themselves are generally symmetric in cross-section.

Returning now to a general discussion of the process of this invention, it must be noted that either at the time the fibers are deflected into the deflection conduits or after such deflection, water removal from the embryonic web and through the deflection conduits begins. Or in the case of an air laid embryonic web, deflection without water removal can occur or water removal can occur depending on how much, if any, the air laid web is hydrated while on the first foraminous member. Hydrating the air laid embryonic web to a consistency of from about 15% to about 80%, or from about 20% to about 60%, or from about 30% to about 50%, can provide the necessary molding and fiber rearrangement and can also, reduce the drying energy required later in the process.

Water removal occurs, for example, under the action of differential fluid pressure. In the machine illustrated in FIG. 1, water removal initially occurs at vacuum box 126. Since deflection conduits 22 are open through the thickness of deflection member 19, water withdrawn from the embryonic web passes through the deflection conduits and out of the system as, for example, under the influence of the vacuum applied to bottom surface 24 of deflection member 19. Water removal continues until the consistency of the web associated with conduit member 19 is increased to from about 25% to about 35%. Embryonic web 120 has then been transformed into intermediate web 121.

While applicants decline to be bound by any particular theory of operation, it appears that deflection of the fibers in the embryonic web and water removal from the embryonic web begins essentially simultaneously. Embodiments can, however, be envisioned wherein deflection and water removal are sequential operations. Under the influence of the applied differential fluid pressure, for example, the fibers are deflected into the deflection conduit with an attendant rearrangement of the fibers. Water removal occurs with a continued rearrangement of fibers. Deflection of the fibers, and of the web, causes an apparent increase in surface area of the web. Further, the rearrangement of fibers appears to cause a rearrangement in the spaces or capillaries existing between and among fibers.

It is believed that the rearrangement of the fibers can take one of two modes dependent on a number of factors such as, for example, fiber, length. The free ends of longer fibers can be merely bent in the space defined by the deflection conduit while the opposite ends are restrained in the region of the network surfaces. Shorter fibers, on the other hand, can actually be transported from the region of the network surfaces into the deflection conduit (The fibers in the deflection conduits will also be rearranged relative to one another.) Naturally, it is possible for both modes of rearrangement to occur simultaneously.

As noted, water removal can occur both during and after deflection; this water removal results in a decrease in fiber mobility in the embryonic web. This decrease in fiber mobility tends to fix the fibers in place after they have been deflected and rearranged. Of course, the drying of the web in a later step in the process of this invention serves to more firmly fix the fibers in position.

Returning again to a general discussion of the fourth step of the process of this invention, the deflecting may be effected under such conditions that there is essentially no water removal from the embryonic web after its association with the deflection member and prior to the deflection of the fibers into the deflection conduits. As an aid in achieving this condition, deflection conduits 22 are isolated one from another. This isolation, or compartmentalization, of deflection conduits 22 is of importance to ensure that the force causing the deflection, such as an applied vacuum, is applied relatively suddenly and in sufficient amount to cause deflection of the fibers rather than gradually, as by encroachment from adjacent conduits, so as to remove water without deflecting fibers.

In the illustrations, the opening of deflection conduit 22 in top surface 23 and its opening in bottom surface 24 are shown essentially equal in size and shape. There is no requirement that the openings in the two planes be essentially identical in size and shape. Inequalities are acceptable so long as each deflection conduit 22 is isolated from each adjacent deflection conduit 22; in fact, circumstances where unequal openings are preferred can be selected. For example, a sharp decrease in the size of a deflection conduit could be useful in forming an interior shelf or ledge which will control the extent of fiber deflection within the deflection conduit. (In other embodiments, this same type of deflection control can be provided by the woven foraminous element included within the deflection member.) Further, when the deflection member is a belt, the reverse side of deflection member 19 is provided with bottom surface 24, which is preferably planar. This planar surface tends to contact the means for application of differential fluid pressure (vacuum box 126, for example) in such a way that there is a relatively sudden application of differential fluid pressure within each deflection compartment for the reasons noted above.

Fifth Step

The fifth step in the process of this invention can be drying of the intermediate web to form a pre-dried web. Any convenient means conventionally known in the papermaking art can be used to dry the intermediate web. For example, flow-through dryers, through air dryers, impulse dryers, microwave and other radiofrequency dryers, flotation dryers, radial jet reattachment dryers, and Yankee dryers, alone and in combination, may be used.

One embodiment for drying the intermediate web is illustrated in FIG. 1. After leaving the vicinity of vacuum box 126, intermediate web 121, which is associated with the deflection member 19, passes around deflection member return roll 14 and travels in the direction indicated by directional arrow 82. Intermediate web 121 first passes through optional pre-dryer 125. This pre-dryer can be a conventional flow-through dryer (hot air dryer) well known to those skilled in the art.

Optionally, pre-dryer 125 can be a so-called capillary dewatering apparatus. Or, pre-dryer 125 can be a combination capillary dewatering apparatus and flow-through dryer. In a capillary dewatering apparatus, the intermediate web passes over a sector of a cylinder having preferential-capillary-size pores through its cylindrical-shaped porous cover. The porous cover can comprise hydrophilic material which is substantially non-resilient and which renders the surfaces of the porous cover wettable by the liquid of interest. One portion of the interior of the cylinder can be subjected to a controlled level of vacuum to effect pneumatically augmented capillary flow of liquid from the web and another portion of the interior of the cylinder can be subjected to pneumatic pressure for expelling the transferred liquid outwardly through a portion of the porous cover which is not in contact with the web.

Generally, the level of vacuum is controlled as a function of airflow to maximize liquid removal from the web while substantially obviating airflow through the capillary-sized pores of the porous cover of the cylinder. Preferential-size pores are such that, relative to the pores of the wet porous web in question, normal capillary flow would preferentially occur from the pores of the web into the preferential-capillary-size pores of the porous cover when the web and porous cover are juxtaposed in surface-to-surface contact.

The quantity of water removed in pre-dryer 125 is controlled so that pre-dried web 122 exiting pre-dryer 125 has a consistency of from about 30% to about 98%. In other embodiments, the pre-dried web can have a consistency of from about 45% to about 95%, from about 50% to about 90% or from about 55% to about 80%. Pre-dried web 122, which is still associated with deflection member 19, passes around deflection member return roll 114 and travels to the bonding material application station 127.

Sixth Step

The sixth step in the process can be the application of a bonding material to the pre-dried web to form a bond material penetrated paper web. The bonding material applicator station 127 applies bonding material to the pre-dried web for the purpose of enhancing its physical properties. Either side or both sides of the paper web can have a bonding material applied to any portion of the paper web in various patterns. The paper web with the applied bonding material can be adhered to and dried on a drying cylinder, such as a Yankee dryer, and then the web can be creped from the surface of the drying cylinder.

Applicator Station

Any suitable applicator station 127 may be used to apply the bonding material such as: a printing station (such as rotogravure or flexographic for example), a spraying station, a Uniform Fiber Depositor station (such as that made by Dynatec a subsidiary of Illinois Tool Works located in Hendersonville, Tenn.), a coater station (such as slot, roll, or air knife for example), a size press station, or a foam applicator station A suitable apparatus for applying the bonding material is disclosed in U.S. Pat. No. 5,840,403 issued to Trokhan et al. on Nov. 24, 1998, and herein incorporated by reference.

Any known printing technique can be used to apply bonding material to the web, including gravure printing, offset printing, flexographic printing, slot coating, ink jet printing (e.g., thermal drop on demand ink jets, piezoelectric drop on demand ink jets, continuous ink jets, etc.), and other forms of digital printing including electrostatic printing and electrophotography, such as the CreoScitex SP system of CreoScitex (Tel Aviv, Israel). Other exemplary printer systems include the Vutek UltraVu printers (Vutek, Meredith, N.H.) as examples of high resolution, wide ink jet printers (2 meters, for example); the DisplayMaker FabriJet XII 12-cartridge printer of ColorSpan Corp. (Eden Prairie, Minn.), and the wide ink-jet printing Artistri system of DuPont (Wilmington, Del.). Printing techniques conventionally used for applying inks can generally be adapted to apply bonding materials with or without added color. For example, principles of adapting flexographic printing for the application of viscous bonding materials to tissue and other fibrous webs has been disclosed in U.S. application Ser. No. 10/329, 991, "Flexographic Printing to Deliver Highly Viscous Agents in a Pattern to the Skin-Contacting Surface of an Absorbent Article," filed Dec. 26, 2002, by Chen and Lindsay, and in U.S. application Ser. No. 10/305791, "Structural Printing of Absorbent Webs," filed Nov. 27, 2002, by Chen et al., both of which are herein incorporated by reference. Anilox rolls for application of printed adhesive to one or both sides of a tissue web are disclosed in U.S. Pat. No. 6,607,630, "Print Bonded Multi-Ply Tissue," issued Aug. 19, 2003, to Bartman et al., which can be adapted for printing single or multi-ply webs of the present invention.

Any known spray technology can be used to apply the bonding material, including DRYAD spray technology by Dryad Technology, Delaware, as described by R. H. Donnelly and M. Kangas, *Paperi ja Puu*, Vol. 83, No. 7, pp. 530–531. Another embodiment is disclosed in U.S. Pat. No. 4,944,960, "Method and Apparatus for Coating Paper and the Like," issued Jul. 31, 1990 to Sundholm et al. In this technology, the coating material passes into a nozzle that ejects the material to a region with an annular high-velocity gas flow around it that carries the coating material to the surface of substrate. Electrostatic charge can be used to improve delivery of entrained coating material (such as a fog or mist) to the substrate. Printing of the bonding material can be done selectively or substantially exclusively to the network region of the web, or can be applied to portions of both the network region and the domes, or can be selectively applied to the domes.

Another spraying technology is the OPTISPRAY coater of Metso Paper, described in "Spray for Light-weight Coating," *Paperi ja Puu*, Vol. 83, No. 7, pp. 526–528. Another spraying technology is disclosed in U.S. Pat. No. 6,063,449, "Method and Apparatus for Coating a Moving Paper or Cardboard Web," issued May 16, 2000, to Koskinen et al. Multiple spray nozzles can apply a substantially uniform coating to the surface of the substrate. Masks or other means can be applied to direct the spray selectively in a predetermined pattern, including selective application to the network region or other regions of the web.

Hot melts and other viscous bonding materials can be applied to the web with known hot melt or adhesive applicator technology. For example, U.S. Pat. No. 4,949,668 issued Aug. 21,1990, to Heindel, et al. discloses an apparatus for depositing adhesive onto a substrate in a semi-cycloidal pattern. The semi-cycloidal pattern closely controls the cross-directional positioning of the adhesive filament to reduce overspray and waste. U.S. Pat. No. 4,891,249 issued Jan. 2, 1990, to McIntyre and U.S. Pat. No. 4,996,091 issued Feb. 26, 1991, to McIntyre disclose an apparatus and process for generating fluid fiber adhesive droplets and combinations of adhesive fibers and droplets. The fibers, droplets and combinations thereof are generated by funneling a cone of pressurized air symmetrically about the adhesive filament. This can result in a pattern of randomly laid criss-crossing fiber deposits onto the face of the lamina. U.S. Pat. No. 5,143,776, issued Sep. 1, 1992, to Givens discloses adhesive applied in a longitudinally oriented stripe. The stripe is deposited either in a spiral pattern or a melt blown pattern.

Alternatively, the bonding material may be applied to the surface of the Yankee dryer (or other drum that contacts the paper web, which can be but need not be heated) by the application station, such as by spraying, printing, coating, or other means. The patterned application of an adhesive joining a web to a creping surface creates conditions for differential adhesion of the paper web to the creping surface, and thus for creating a paper web having differential regions.

In another embodiment, the paper web 124 after drying and the optional creping step can be sent to an offline coating, drying, and optional creping operation. "Offline" is used to describe a secondary process separate and distinct from the paper machine, which forms and dries the embryonic paper web to form a dried paper web that is wound into a paper roll by the reel section. "Online" refers to a process disposed within the paper machine upstream of the reel section. An offline process for applying bonding material as described is disclosed in U.S. Pat. No. 3,879,257 issued Apr. 22, 1975, to Gentile et al. and herein incorporated by reference. Other offline processes can include photocuring of a photocurable bonding material, application of electron beams or other forms of radiation to cure the bonding material, application of a suitable temperature for a suitable period of time to cure the bonding material, and the like.

Figure 11:
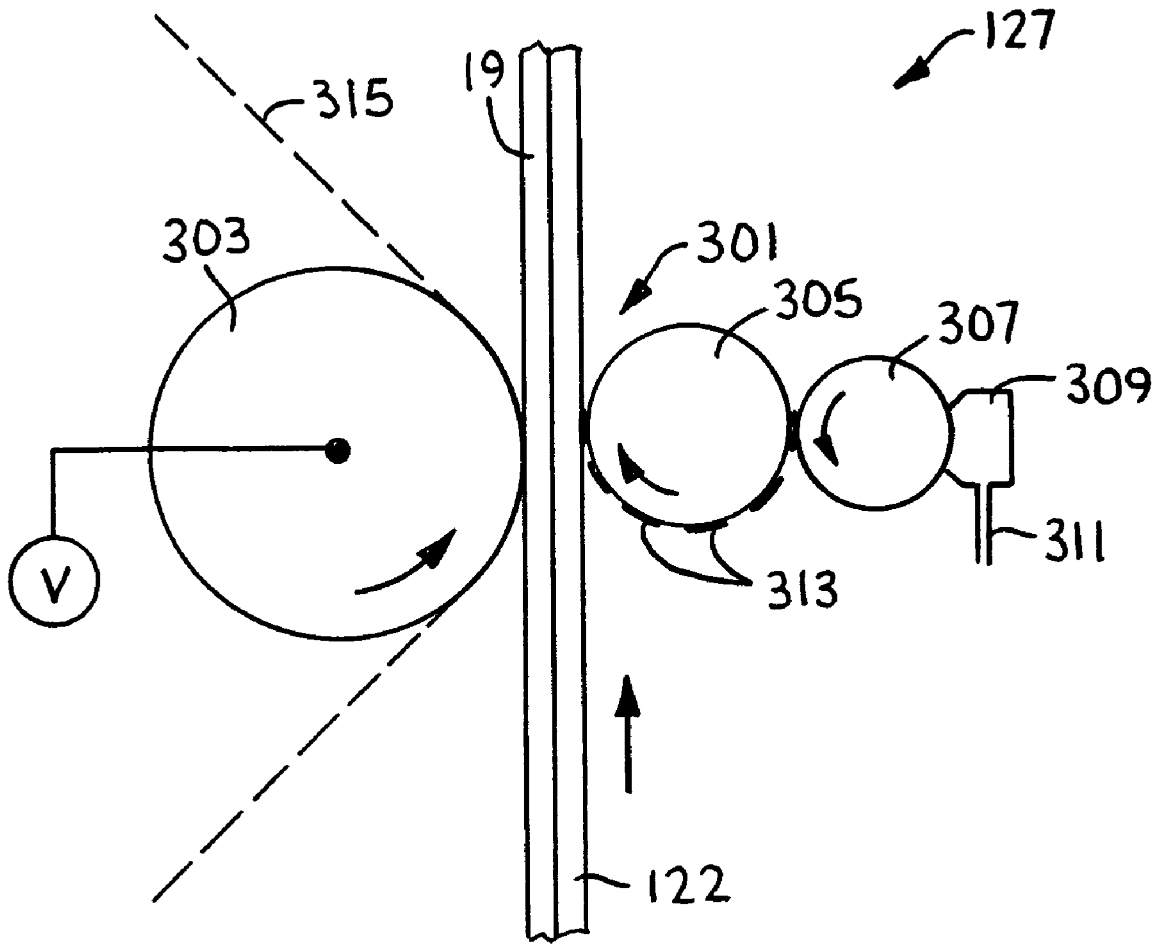
FIG. 11 is a schematic representation of one embodiment of an applicator station.

Referring now to FIG. 11, one embodiment for applying the bonding material to the pre-dried web 122 in an online process is illustrated. The deflection member 19 and pre-dried web 122 pass through a gap 301 between an anvil roll 303 and a transfer roll 305. The gap between the anvil roll and the transfer roll is adjustable. Adjacent to the transfer roll is a metering roll 307, such as a gravure roll. The metering roll is in fluid communication with a reservoir 309, such as a chamber doctor blade reservoir. The chamber doctor blade reservoir is supplied with a supply of bonding material 311. Upon axial rotation, the metering roll acquires bonding material from the reservoir, which precisely fills in the individual cells of the metering roll by means of the chamber's doctor blades. The metering roll then transfers a particular quantity of the bonding material 313 to the transfer roll. The transfer roll then transfers the bonding material to the pre-dried web.

The pre-dried paper web passes through the gap while residing on the deflection member. The bonding material is preferentially applied to the network region of the pre-dried web since the domes are deflected into the deflection conduits as illustrated in FIG. 7. As such, most of the bonding material is applied to the network region; however, it is possible for the bonding material to migrate into the domes by use of a low viscosity bonding material or by reducing the gap to create a nip such that the pre-dried web 122 is compacted in the nip between the anvil roll and the transfer roll.

If desired to facilitate improved transfer of the bonding material and to further bias the application of the bonding material to the network regions, the anvil roll may be a vacuum anvil roll. The vacuum anvil roll can be of a similar construction to a pressure roll on a wet-pressed paper machine having a plurality of apertures in the exterior shell and an adjustable vacuum box internal to the roll. Alternatively, the vacuum roll can be constructed of a sintered metal or mesh material that is fluid permeable to gasses or liquids. An adjustable vacuum box can be included internal to the vacuum anvil roll in order to focus the vacuum to a specific circumferential region of the roll. Use of a vacuum anvil roll can assist in keeping the domes deflected into the deflection conduits during printing of the bonding material, thereby avoiding placement of the bonding material onto the domes. If needed to further enhance the vacuum's effect, the deflection member and the pre-dried paper web can be wrapped circumferentially about the vacuum anvil roll any desired amount as illustrated by dashed line 315 in FIG. 11.

Vacuum levels in the vacuum anvil roll can range from about 0 to about 25 inches of mercury, with higher levels being used for heavier basis weight sheets and/or to cause a greater deflection of the domes into the deflection conduits. Lower vacuum levels can be used for lighter basis weight sheets and/or when less deflection of the domes into the deflection conduits is desired.

In one embodiment, the amount of bonding material applied, the viscosity of the bonding material and the gap are all controlled so as to minimize the chances for any bonding material being applied to regions of the pre-dried paper web where the domes are present. The bonding material can be disposed upon, registered with, and immobilized on the network regions of the pre-dried paper web in a particular predetermined pattern.

It will be apparent to one skilled in the art that by increasing or decreasing the gap, or by creating a nip, smaller or larger amounts of the bonding material may be applied to the pre-dried web. Likewise, changing the design of the metering roll or changing the rotational speeds of the transfer roll and the metering roll relative to each other and/or the pre-dried web will alter the amount of bonding material applied to the pre-dried web.

Bonding Materials

The bonding material utilized in the process and product of the invention can be capable of several functions, one being the ability to bond fibers in the paper web to one another and the other being the ability to adhere the bonded portions of the web to the surface of the creping drum such as a Yankee dryer.

As used herein, a "bonding material" is any water insoluble polymeric additive or blend of additives capable of increasing the dry and/or wet strength properties of the paper web. Suitable water insoluble polymeric additives may include the following: emulsified polymers, including latex emulsion polymers and latex-free emulsified polymers; hydrophilic or hydrophobic insoluble polymers; insoluble polymers with repeating groups that either contain a nitrogen atom or do not contain nitrogen; cationic, anionic, amphoteric or nonionic polymers; thermoplastic polymers, including hot melt polymers; thermosetting polymers and photocurable polymers. The bonding material may be either a self-crosslinking polymer, or a polymer with reactive functional groups that can be crosslinked with a suitable reactive species, or a non-reactive species that can increase strength via film forming, heat sealing or other non-crosslinking mechanism. The water insoluble polymeric additive can include acrylate latex rubber emulsions, useful on unheated as well as heated creping surfaces; emulsions of resins such as acrylates, vinyl acetates, vinyl chlorides, and methacrylates, all of which are useful on a heated creping surface.

The water insoluble polymeric bonder material can be selected from ethylene vinyl acteate copolymer, ethylene vinyl chloride copolymer, carboxylated ethylene vinyl acetate terpolymer, acrylics, acrylates, polystyrene, styrene-butadiene, polyurethane and other polymers as well as chemically modified versions of the above list. If used in conjunction with the water insoluable bonder polymer, reactants could be selected from aldehyde-functional molecules, epoxy-functional molecules or other functional molecules. Reactants are chemicals whose functional species can react with the water insoluble polymeric additive to provide additional tensile strength to the paper. The strength properties may be improved by use of suitable catalysts.

Other bonding materials can include thermosetting resins, compounds comprising polysaccharides and their derivatives combined with a latex or curable polymers, curable adhesives including structural adhesives (epoxies, urethanes, etc.), acrylics, UV-curable adhesives, pressure-sensitive adhesives, hot melts, and the like. The bonding material should be selected to be suitable for the process of manufacturing. For example, if a hot melt is used, the Yankee cylinder or other drum surface should not be heated substantially, but could be chilled to promote solidification of the hot melt. If a photocurable polymer is used, light of a suitable wavelength should be applied to cure the polymer.

In one embodiment, the bonding material can be a self-crosslinking ethylene vinyl acetate co-polymer, such as AIRFLEX EN1165, commercially available from Air Products Polymers, L.P. (Allentown, Pa.), or an acrylic emulsion, HYCAR 26084, commercially available from Noveon, Inc. (Cleveland, Ohio). In other embodiments, the latex is not self-crosslinking, and in still other embodiments, the latex is substantially free of the crosslinking agent NMA (N-methylolacrylamide and its derivatives). The bonding material may comprise a mixture of the water insoluble polymer and other water soluble ingredients. For example, one ingredient having the ability to accomplish interfiber bonding and the other ingredient utilized to create adherence of the paper web to the creping surface. In either instance, the materials can be applied as an integral mixture to the same areas of the web.

In some embodiments, the bonding material does not comprise a latex, or does not comprise natural latex. In related embodiments, the bonding material may be substantially latex free, or may be substantially free of natural latex. In another embodiment, the paper web is substantially free of proteins commonly found in natural latex, such that the paper webs of the present invention can be safely used by those who are allergic to natural latex.

Suitable hotmelts may include, but are not limited to, EVA (ethylene vinyl acetate) hot melts (e.g. copolymers of EVA), polyolefin hotmelts, polyamide hotmelts, pressure sensitive hot melts, styrene-isoprene-styrene (SIS) copolymers, styrene-butadiene-styrene (SBS) copolymers, ethylene ethyl acrylate copolymers (EEA), polyurethane reactive (PUR) hotmelts, and the like. In one embodiment, poly(alkyloxazoline) hotmelt compounds may be used. If desired, the hotmelt may be water sensitive or water-remoistenable. This may be desirable, for example, in an embodiment wherein the applied hotmelt may be moistened and then joined to another surface to bond the printed web to the other surface.

The bonding material may also comprise acrylic polymers including those formed from polymerization of at least one alkyl acrylate monomer or methacrylate, an unsaturated carboxylic acid and optionally a vinyl lactam. Examples of alkyl acrylate or methacrylate esters include, but are not limited to, butyl acrylate, ethyl acrylate, 2-ethylhexyl acrylate, isooctyl acrylate, isononyl acrylate, isodecyl acrylate, methyl acrylate, methylbutyl acrylate, 4-methyl-2-pentyl acrylate, see-butyl acrylate, ethyl methacrylate, isodecyl methacrylate, methyl methacrylate, and the like, and mixtures thereof. Examples of ethylenically unsaturated carboxylic acids include, but are not limited to, acrylic acid, methacrylic acid, fumaric acid, itaconic acid, and the like, and mixtures thereof. An ethylenically unsaturated carboxylic acid monomer is acrylic acid. Examples of vinyl lactams include, but are not limited to, N-vinyl caprolactam, 1-vinyl-2-piperidone, 1-vinyl-5-methyl-2-pyrrolidone, vinyl pyrrolidone, and the like, and mixtures thereof.

Optionally, the bonding material may also include a tackifier. Tackifiers are generally hydrocarbon resins, wood resins, rosins, rosin derivatives, and the like. It is contemplated that any tackifier known by those of skill in the art to be compatible with water insoluble polymer compositions may be used with the present embodiment of the invention. One such tackifier found to be suitable is Wingtak 10, a synthetic polyterpene resin that is liquid at room temperature, and sold by the Goodyear Tire and Rubber Company of Akron, Ohio. Wingtak 95 is a synthetic tackifier resin also available from Goodyear that comprises predominantly a polymer derived from piperylene and isoprene. Other tackifying additives may include Escorez 1310, an aliphatic hydrocarbon resin, and Escorez 2596, a C5–C9 (aromatic modified aliphatic) resin, both manufactured by Exxon of Irving, Tex. Of course, as may be appreciated by those of skill in the art, a variety of different tackifying additives may be used to practice the present invention.

In addition to tackifiers, other additives may be used to impart desired properties. For example, plasticizers may be included. Plasticizers are known to decrease the glass transition temperature of a bonding material composition containing elastomeric polymers. An example of a suitable plasticizer is Shellflex 371, a naphthenic processing oil available from Shell Oil Company of Houston, Tex. Antioxidants also may be included in the bonding material compositions. Exemplary antioxidants include Irgafos 168 and lrganox 565 available from Ciba-Geigy, Hawthorne, N.Y. Cutting agents such as waxes and surfactants also may be included in the bonding materials.

In another embodiment, the bonding material may be substantially free of quaternary ammonium compounds, or may be substantially free independently of any of the following or any combination thereof: petrolatum, silicone oil, beeswax, emulsions, paraffin, fatty acids, fatty alcohols, water, any hydrophobic material with a melting point less than 50° C., epichlorohydrins, conventional papermaking wet strength additives (either temporary or permanent wet strength additives or both), starches and starch derivatives, gums; cellulose derivatives such as carboxymethylcellulose or carboxyethylcellulose; chitosan or other materials derived from shellfish; proteins or materials derived from proteins; super absorbent materials; a polyacrylate or polyacrylic acid; cationic polymers, surfactants, polyamides, polyester compounds, chlorinated polymers, heavy metals, aluminum compounds, water soluble polymers, water-soluble salts, a slurry, a dispersion, and opaque particles. In one embodiment, for example, the bonding material is not a water-soluble wet strength agent, such as a cationic nitrogen-containing polymer. It may also have a softening temperature about 60° C., such as about 80° C. or greater, more specifically about 100° C. or greater, most specifically about 130° C. or greater.

In one embodiment, the bonding material may comprise an acrylic resin terpolymer. For example, the bonding material may comprise an acrylic resin terpolymer containing 30 to 55 percent by weight styrene, 20 to 35 percent by weight acrylic acid or methacrylic acid and 15 to 40 percent by weight of N-methylol acrylamide or N-methylol methacrylamide, or may comprise a water-soluble melamine-formaldehyde aminoplast and an elastomer latex.

Other suitable bonding materials include acrylic based pressure sensitive adhesives (PSAs), suitable rubber based pressure sensitive adhesives and suitable silicone pressure sensitive adhesives. Examples of suitable polymeric rubber bases include one or more of styrene-isoprene-styrene polymers, styrene-olefin-styrene polymers including styrene-ethylene/propylene-styrene polymers, polyisobutylene, styrenebutadiene-styrene polymers, polyisoprene, polybutadiene, natural rubber, silicone rubber, acrylonitrile rubber, nitrile rubber, polyurethane rubber, polyisobutylene rubber, butyl rubber, halobutyl rubber including bromobutyl rubber, butadieneacrylonitrile rubber, polychloroprene, and styrene-butadiene rubber.

In one embodiment, a rubber based bonding material may be used that may have a thermoplastic elastomeric component and a resin component. The thermoplastic elastomeric component may contain about 55–85 parts of a simple A-B block copolymer wherein the A-blocks are derived from styrene homologs and the B-blocks are derived from isoprene, and about 15–45 parts of a linear or radical A-B-A block copolymer wherein the A-blocks are derived from styrene or styrene homologs and the B-blocks are derived from conjugated dienes or lower alkenes, the A-blocks in the A-B block copolymer constituting about 10–18 percent by weight of the A-B copolymer and the total A-B and A-B-A copolymers containing about 20 percent or less styrene. The resin component may comprise tackifier resins for the elastomeric component. In general, any compatible conventional tackifier resin or mixture of such resins may be used. These include hydrocarbon resins, rosin and rosin derivatives, polyterpenes and other tackifiers. The bonding material composition may contain about 20–300 parts of the resin component per one hundred parts by weight of the thermoplastic elastomeric component. One such rubber-based bonding material is commercially available from Ato Findley under the trade name HM321 0.

In other embodiments, the bonding material may comprise a mixture of several materials, one having the ability to accomplish interfiber bonding and the other being utilized to create adherence of the web to the creping surface. In either instance, the materials can be applied as an integral mixture to the same areas of the web. Such materials may also comprise any of the materials listed above, mixed with a low molecular weight starch, such as dextrin, or low molecular weight resin such as carboxy methyl cellulose or polyvinyl alcohol.

Cationic and anionic polymer latexes may also be used, including the latexes of U.S. Pat. No. 4,710,374, "Cosmetic Composition Containing Cationic Polymers and Anionic Latexes," issued Dec. 1, 1987 to Grollier et al.; U.S. Pat. No. 4,785,030, "Cationic Latex Compositions Capable of Producing Elastomers with Hydrophilic Surfaces," issued Nov. 15, 1988 to Noda et al.; U.S. Pat. No. 5,312,863, "Cationic Latex Coatings," issued May 17, 1994 to Van Rheenen et al.; U.S. Pat. No. 6,462,159, "Cationic Deproteinized Natural Rubber Latex," Hamada et al., issued Oct. 8, 2002; and WO 00/08077. Latex compositions can also include styrene/n-butyl acrylate/glycidyl methacrylate and styrene/n-butyl acrylate/methacrylic acid core-shell latex blends, as reported by Y. Zhao and M. Urban, *Macromolecules*, Vol. 33, No. 22, pp. 8426–8434, Oct. 31, 2000.

Bonding Material Properties

When selecting the water insoluble polymer bonding material, it can be useful to use polymers with low glass transition temperatures to reduce the stiffness of the bond material penetrated paper for applications where low stiffness is desired. Suitable bonding materials may have glass transition temperatures in any of the following ranges: about 100° C. or less, about 50° C. or less, about 25° C. or less, about 15° C. or less, about 5° C. or less, less than 0° C., less than −10° C., from about −100° C. to about 150° C., from about −50° C. to about 100° C., from about −40° C. to about 30° C., and from about −10° C. to about 10° C.

The viscosity of the bonding material as it is applied to the web can be selected or controlled to achieve desired effects, such as to control the degree of wicking or the depth of penetration into the web or to allow some of the bonding material to remain above the surface of the web. For some applications, the bonding material when applied to the web can have a viscosity similar to or greater than the viscosity ranges commonly used for inks. By way of example, conventional flexographic inks for printing on paper typically have low viscosity, such as a viscosity of about 2 poise or less measured with a Brookfield viscometer at 20 revolutions per minute. More viscous inks are known for use on textiles, wherein the inks may have viscosities of about 10–65 poise at 20 RPM on a Brookfield viscometer. Note that 1 poise (p) is equivalent to 100 centipoise (cp). Higher viscosity inks and pastes have also been disclosed for flexographic printing on textiles, however, according to the present invention, adhesive material having still higher viscosities may be applied with flexographic printing means or other means on a paper web.

Viscosity can be measured at the temperature of application to the web. However, unless stated otherwise, a viscosity measurement of the bonding material will be understood to refer to measurement with a Brookfield viscometer at 20 rpm or an equivalent method, and conducted at a temperature of 25° C., 100° C., or 195° C., whichever temperature is closest to the actual temperature of the bonding material when it is applied to the paper web. Thus, the viscosity of the bonding material as measured at 25° C., 100° C., or 195° C. can be any of the following: about 0.5 poise to about 5 poise, about 10 poise or less, from about 5 poise to about 50 poise, about 50 poise or greater, or from about 30 poise to about 2000 poise.

Alternatively, at the temperature of application, or at 25° C., 100° C., or 195° C., the bonding material to be applied to a cellulosic web according to the present invention may have a viscosity measured at 20 rpm on a Brookfield viscometer of 20 poise (p) or greater, such as 30 p, 50 p, 100 p, 200 p, 500 p, 1,000 p, 5,000 p, 10,000 p, 20,000 p, or greater.

Alternatively, hot melt adhesives for use in the present invention may have a viscosity evaluated at 195° C. of 1 poise to 300 poise (100 cp to 30,000 cp), more specifically from about 10 poise to 200 poise, and most specifically from about 20 poise to about 100 poise. If a latex or other non-melting bonding material is used, the viscosity as applied (prior to drying or curing) may be greater than 25 cp, specifically about 60 cp or greater, more specifically about 100 cp or greater, more specifically still about 200 cp or greater, such as from about 150 cp to about 500 cp, or from about 200 cp to about 1000 cp, or from about 260 cps to about 5000 cp. Solid content of a latex may be about 10% or greater, about 25% or greater, about 35% or greater, or about 45% or greater.

The bonding material in some embodiments may have a measurable melting temperature such as about any of the following or greater: 40° C., 60° C., 80° C., 100° C., 120° C., 150° C., 200° C., 250° C., and 300° C. In certain embodiments, the melting point of the adhesive may be from about 40° C. to about 200° C., from about 60° C. to about 150° C., or from about 60° C. to about 120° C.

The bonding material may be transparent, white, beige, yellow, tan, or other known colors for bonding materials, and may further comprise pigments or dyes to enhance the visibility of the bonding material for aesthetic effects. Bonding materials may be lighter or darker than the tissue substrate. Two or more colors of bonding materials may be used, with different colors placed on the tissue in differing patterns to create visible designs or images having two or more colors. The bonding material in some embodiments may be substantially free of dyes or pigments (in contrast to typical inks), and may be substantially non-pigmented or uncolored (e.g., colorless or white).

In one embodiment, the bonding material is a liquid prior to application to the paper web, and in the liquid state, may have a Gardner Color of about 8 or less, about 4 or less, or about 1 or less. Alternatively, the Gardner Color may be about 4 or greater or about 8 or greater. Gardner color of liquids can be determined by ASTM method D-1544.

In another embodiment, HunterLab Color Scale (from Hunter Associates Laboratory of Reston, Va.) measurements of the color of a 50 micron film of the bonding material (in a solid or cured state, when possible) on a white substrate yields absolute values for "a" and "b" each about 25 or less, more specifically each about 10 or less, more specifically still each about 5 or less, and most specifically each about 3 or less. The HunterLab Color Scale has three parameters, L, a, and b. "L" is a brightness value, "a" is a measure of the redness (+a) and greenness (−a), and the "b" value is a measure of yellowness (+b) and blueness (−b). For both the "a" and "b" values, the greater the departure from 0, the more intense the color. "L" ranges from 0 (black) to 100 (highest intensity). The bonding material may have an "L" value (when printed as a 50 micron film on a white background) of about 40 or greater, about 60 or greater, about 80 or greater, or about 85 or greater. Alternatively, the "L" value may be less than 90, less than 85, less than 80, or less than 75. In some embodiments, the absolute value of the "a" value plus the absolute value of the "b" value yields a sum of about 10 or greater, or about 15 or greater, or about 25 or greater. Measurement of materials to obtain HunterLab L-a-b values may be done with a Technibryte Micro TB-1C tester manufactured by Technidyne Corporation, New Albany, Ind., USA.

Bonding Material Application

The amount of bonding material applied to either the pre-dried paper web or the paper web in an offline process may be varied over a wide range and still obtain many of the benefits of the invention. The percent of bonding material present can be affected by the desired surface area coverage and the desired penetration of the bonding material. For a multi-ply product, the percent of the bonding material present in each ply can be the same or different. Analogously, the type of bonding material present in each ply can be the same or different.

For some embodiments, such as where the products of the invention are absorbent wipe products, it may sometimes be desirable to reduce the amount of bonding material. In various embodiments, the ratio of bonding material mass to fiber mass in the product, or, more specifically, the ratio of bonding material mass to cellulosic fiber mass in the product, expressed as a percentage, can be any of the following: about 3% or greater, about 5% or greater, about 10% or greater, about 20% or greater, about 25% or greater, about 30% or greater, about 40% or greater, about 50% or greater, from about 3% to about 100%, from about 3% to about 60%, from about 3% to about 20%, from about 3% to about 12%, from about 5% to about 150%, from about 5% to about 80%, from about 10% to about 50%, or from about 15% to about 40%.

The bonding material can be placed on the pre-dried paper web in any desirable pattern such as fine lines, dots, crossing lines, sinuous lines, patterns that form recognizable images such as those of birds or flowers, or other patterns. In various embodiments of the invention, the bonding material occupies from about 15% to about 60% of the surface area of one side of the bond material penetrated paper web. Alternatively, the bonding material may occupy any of the following percentage ranges of one side of the bond material penetrated paper web: about 5% or more, about 30% or more, over 50%, from about 10% to about 90%, from about 20% to about 80%, from about 20% to about 70%, less than about 60%, and less than 50%. In each of these embodiments, the other side of the bond material penetrated paper web can have bonding material present in the same percentage ranges or have the absence of any bonding material. In other embodiments of the invention, the bonding material covers substantially the entire network region.

FIG. 3 of U.S. Pat. No. 3,879,257 issued to Gentile et al., previously incorporated by reference, shows one embodiment of a print pattern that can be used for applying a bonding material to a paper sheet in accordance with this invention. As illustrated, the pattern represents a succession of discrete dots. In one embodiment, for instance, the dots can be spaced so that there are approximately from about 25 to about 35 dots per inch in the machine direction and/or the cross-machine direction. The dots can have a diameter, for example, of from about 0.01 inches to about 0.03 inches. In one particular embodiment, the dots can have a diameter of about 0.02 inches and can be present in the pattern so that approximately 28 dots per inch extend in either the machine direction or the cross-machine direction. In this embodiment, the dots can cover from about 20% to about 30% of the surface area of one side of the bond material penetrated paper web and, more particularly, can cover about 25% of the surface area of the web.

Besides dots, various other discrete shapes can also be used when printing the moisture barrier coaling onto the sheet. For example, a print pattern in which the binder material pattern is made up of discrete multiple deposits that are each comprised of three elongated hexagons is disclosed in Attorney Docket No. 19,693 entitled Low Odor Binders Curable at Room Temperature filed with the U.S. Patent and Trademark Office an Sep. 2, 2003, which has been assigned U.S. patent application Ser. No. 10/654,556 and is herein incorporated by reference. In one embodiment, each hexagon can be about 0.02 inches long and can have a width of about 0.006 inches. Approximately 35 to 40 deposits per inch can be spaced in the machine direction and the cross-machine direction. When using hexagons, the pattern can cover from about 40% to about 60% of the surface area of one side of the paper web, and more particularly can cover about 50% of the surface area of one aide of the paper the web.

Without being bound by theory, the bonding material of the present invention migrates or penetrates through a portion of the thickness of the paper web assisting with inter-fiber bonding, thereby creating the desirable qualities of the inventive paper. These qualities can be further enhanced by the optional creping step. The bonding material may or may not extend all the way through from one surface of the paper to the other surface. For example, if the bonding material is only applied to the network regions of the paper, the bonding material can advantageously extend completely through the network region of the paper, thus providing maximum strength while still maintaining softness and absorbency within the domed regions of the paper.

The penetration of the bonding material through the paper can be measured without a confining pressure, using microtomoscopy or stereoscopic three-dimensional scanning electron microscopy imaging, as are well known in the art. In order to aid the visual understanding of bonding material penetration into the sheet, the bonded sheet may be stained with an appropriate material to make the bonding material visually distinct from the underlaying fiber web. In instances where the bonding material is either an ethylene vinyl acetate polymer, an ethylene vinyl chloride polymer or an acrylic latex polymer, the following method was developed to render the bonding material visible, so that the overall (macro) distribution as well as the micro distribution (e.g. cross-section, penetration and spreading) of bonding material could be observed. DuPont Fiber Identification Stain #4 (Pylam Products Company, Inc., Garden City, N.Y.) is a blend of dyes used in the textile industry for fiber identification. It is used for this test because it effectively stains the components of a bonded web in contrasting colors; yellow and/or green for wood fibers and deep orange to red for bonding material. Two methods are described for staining a 10-inch by 11-inch (approximate size) sheet. The second method variation has been used successfully on webs with minimal bonding material and therefore poor wet strength.

METHOD 1—For Highly Reinforced Sheets

1. Heat a minimum of 400-milliliters (mL) of distilled or filtered water to a boil on a hot plate. Pre-heating in a microwave oven will save some time.

2. Carefully add DuPont Stain #4 while stirring to avoid boil-over. A 2% weight volume solution is desired (i.e. 2 grams of stain per 100-mL of water).
3. Transfer 400-mL of hot solution to a 600-mL–1,000-mL beaker.
4. Drop in a wadded sheet sample and stir gently to agitate for 1 minute.
5. Pour off solution into sink with running water, carefully refill with cold water and stir gently.
6. Repeat step 5 until rinse water begins to clear.
7. Pour solution and sheet onto shallow tray and gently unfold sheet until it is spread flat.
8. Fill and drain tray until the rinse water remains clear. Hold sheet corners down to prevent the sheet from sliding off the tray.
9. Drain tray and blot both sides of the sheet sample with a dry paper towel.
10. Set the wet sheet sample aside to dry, preferably on a smooth, hard surface for best shape retention.

METHOD 2—For Sheets With Weak Reinforcement

1. Heat a minimum of 300-mL of distilled or filtered water to a boil on a hot plate. Pre-heating in a microwave oven will save some time.
2. Carefully add DuPont Stain #4 while stirring to avoid boil-over. A 2% weight volume solution is desired (i.e. 2 grams of stain per 100-mL of water).
3. Place sheet sample, without folding, in nylon mesh envelope, and place mesh envelope in a shallow tray. Carefully pour 300-mL of the hot dye solution uniformly over the sample.
4. Remove and lower the envelope into the shallow tray repeatedly to agitate for one minute.
5. Pour the dye solution off into a sink with running water. Hold the mesh envelope corners down to prevent the envelope from sliding off the tray.
6. Carefully run cold water over the envelope and sample while holding the envelope and tray nearly vertical until the rinse water runs clear.
7. Remove the envelope from the tray, let it drain for a moment, and blot both sides with dry paper towel.
8. Set the envelope (with sheet sample inside) aside to dry. The envelope can be hung for very rapid drying.

The stained sheet samples can be observed under magnification in the x-y plane to observe the surface area coverage of the bonding material, and in the z-direction to observe the penetration of the bonding material.

In some embodiments, the bonding material does not extend all the way through to the other surface. In other embodiments, the percentage of the surface area of the web that is occupied by bonding material extending completely through the web can be about 50% or less, about 30% or less, about 20% or less, about 10% or less, from about 5% to about 60%, or from about 10% to about 40%. For a given quantity of bonding material, the surface area occupied by bonding material extending completely through the web corresponds to areas beneath which bonding material is continuously present in traversing from one side of the web to the other.

In various embodiments of the invention, the bonding material penetration upper limit may extend no more than about 60% through the thickness of the finished paper web, through no more than about 40% of the thickness of the finished paper web, or through no more than about 30% of the thickness of the finished paper web. In various embodiments of the invention, the bonding material penetration lower limit can extend through at least about 10% of the thickness of the finished paper web, or through at least about 15% of the thickness of the finished paper web. These lower and upper limits may be combined to form various ranges of the bonding material penetration, such as a bonding material penetration from about 10% to about 60% through the thickness of the paper or such as a penetration of from about 15% to about 30% through the thickness of the paper web.

In some embodiments, the bonding material may also be present above the surface of the paper web, such that an elevated deposit of bonding material exists having a height that extends above the underlying paper web by any of the following: about 1 micron or greater, about 5 microns or greater, about 20 microns or greater, about 50 microns or greater, about 100 microns or greater, about 200 microns or greater, from about 3 microns to about 300 microns, from about 5 microns to about 500 microns, from about 10 microns to about 100 microns, less than 50 microns, less than 10 microns, less than 5 microns, and about 2 microns or less.

In some embodiments, the regions of the tissue web to which bonding material has been applied are depressed relative to the immediately surrounding tissue, possibly due to factors such as compression of the paper during application, contraction of the applied bonding material during curing, loss of bulk due to wetting when aqueous compounds are used, and the like. In one embodiment, the thickness of the web in a region comprising bonding material may be less than the thickness of surrounding untreated regions of the web by a factor of about 5% or greater, about 10% or greater, or about 20% or greater, such as from about 5% to about 30%. In other embodiments, the paper fibers in a region comprising bonding material may occupy a greater thickness than the surrounding tissue web, with the thickness being greater by a factor of about 5% or greater, about 10% or greater, or about 20% or greater, such as from about 5% to about 30%.

Seventh Step

The seventh step in the process of this invention can be drying, curing, or setting the applied bonding material and optionally foreshortening the dried web. Drying, curing, or setting may be achieved by any known method, such as photocuring, application of heat or heated air, and the like. The curing can occur either before or after the optional foreshortening step. For example, the bonding material may be set or cured through the application of heat, ultraviolet light or other forms of radiation, or due to a chemical reaction which may merely require passage of a period of time. In one embodiment, the bonding material may cure through the application of heat, as when the bond material penetrated paper web is pressed against a dryer surface, such as a Yankee dryer, and then the bond material penetrated web can be creped off the surface of the Yankee dryer. In another embodiment, the bonding material is dried on the surface of a Yankee dryer, the bond material penetrated web is then foreshortened, and then the foreshortened bond material penetrated web is cured by heating the web to a temperature of about 260° F. or greater by use of another dryer.

As used herein, foreshortening refers to the reduction in length of a dry paper web which occurs when energy is applied to the dry web in such a way that the length of the web is reduced and the fibers in the web are rearranged with an accompanying disruption of fiber-fiber bonds. Foreshortening can be accomplished in any of several well-known ways. The most common method is creping.

In the creping operation, the dried web is adhered to a surface and then removed from that surface with a doctor blade. Usually, the surface to which the web is adhered also functions as a drying surface and is typically the surface of a Yankee dryer. Such an arrangement is illustrated in FIG. 1.

As pre-dried web 122, with the applied bonding material, passes through the nip formed between impression nip roll 15 and Yankee drier drum 16, the network pattern formed by top surface plane 23 of deflection member 19 is impressed into pre-dried web 122 to form imprinted web 123 or a pattern densified web. Imprinted web 123 is then adhered to the surface of Yankee dryer drum 16 where it is dried to a consistency of at least about 95%.

The adherence of imprinted web 123 to the surface of Yankee dryer drum 16 can be facilitated by the use of a creping adhesive in addition to the bonding material previously applied. Typical creping adhesives include those based on polyvinyl alcohol. Specific examples of suitable adhesives are shown in U.S. Pat. No. 3,926,716 issued to Bates on Dec. 16, 1975, incorporated by reference herein. Creping adhesives can also include solutions or slurries comprising cationic starch, cationic polymers derived from starch such as RAIFIX polymers of Raisio Chemicals (Helsinki, Finland), polyvinylamines, known wet strength agents, and so forth. The adhesive is applied to either pre-dried web 122 immediately prior to its passage through the hereinbefore described nip or to the surface of Yankee dryer drum 16 prior to the point at which the web is pressed against the surface of Yankee dryer drum 16 by impression nip roll 15. (Neither means of glue application is indicated in FIG. 1; any technique, such as spraying, well known to those skilled in the art can be used.)

In general, only the nondeflected portions of the web which have been associated with top surface plane 23 of deflection member 19 are directly adhered to the surface of Yankee dryer drum 16. The paper web adhered to the surface of Yankee dryer drum 16 can be dried to at least about 95% consistency and removed (i.e. creped) from that surface by doctor blade 17. Energy is thus applied to the web and the web is foreshortened. The exact pattern of the network surface and its orientation relative to the doctor blade will in major part dictate the extent and the character of the creping imparted to the web.

Bond material penetrated paper web 124, which is the product of this invention, can optionally be calendered and is either rewound (with or without differential speed rewinding) or is cut and stacked all by means not illustrated in FIG. 1. Bond material penetrated paper web 124 is, then, ready for use.

In addition to creping, other techniques for foreshortening paper webs are known. For example, one technique for mechanically foreshortening a fibrous web involves subjecting the web to compaction between a hard surface and a relatively elastic surface. This general technique is described in U.S. Pat. No. 2,624,245 issued to Cluett on Jan. 6, 1953 and in subsequent patents such as U.S. Pat. No. 3,011,545 issued to Welsh, et al. on Dec. 5, 1961; U.S. Pat. No. 3,329,556 issued to McFalls et. al. on Jul. 4, 1967; U.S. Pat. No. 3,359,156 issued to Freuler et. al. on Dec. 19, 1967; and U.S. Pat. No. 3,630,837 issued to Freuler on Dec. 28, 1971. All of the preceding mentioned patents are incorporated herein by reference. Also useful for foreshortening the web of this invention is the technique known in the trade as microcreping. This technique as described in various patents such as U.S. Pat. No. 3,260,778 issued to Walton et. al. on Jul. 12, 1966; U.S. Pat. No. 3,416,192 issued to Packard et. al. on Dec. 17, 1968; U.S. Pat. No. 3,426,405 issued to Walton et al. on Feb. 11, 1969; and U.S. Pat. No. 4,090,385 issued to Packard et. al. on May 23, 1978. All of the preceding mentioned patents are incorporated herein by reference.

While creping may be used, it is not necessary. In some embodiments, the web is dried against a drum dryer, such as a Yankee dryer, and then removed without creping. In such cases, adhesives or bonding materials applied to the web or the surface of the drum dryer may help join the web to the surface of the drum dryer for effective drying, provided that the web is not so strongly bonded that it cannot be removed without creping. Release agents such as silicone compounds, oils, waxes, quaternary ammonium compounds, and known debonding agents may then be applied to the web or the surface of the drum dryer or both, including the use of solutions comprising both adhesive agents and release materials that are applied by spray application. Such methods and materials are disclosed in U.S. Pat. No. 6,187,137, "Method of Producing Low Density Resilient Webs," issued Feb. 13, 2001 to Druecke et al. and herein incorporated by reference. Multiple transfers of the web may also be used in such processes, as disclosed in U.S. Pat. No. 6,197,154, "Low Density Resilient Webs and Methods of Making Such Webs," issued Mar. 6, 2001 to Chen et al. and herein incorporated by reference.

Other related methods for forming soft tissue webs using drum dryers without creping are disclosed in U.S. Pat. No. 6,143,135, "Air Press for Dewatering a Wet Web," issued Nov. 7, 2000 to Hada et al., and U.S. Pat. No. 6,083,346, "Method Of Dewatering Wet Web Using an Integrally Sealed Air Press," issued Jul. 4, 2000 to Hermans et al. Disclosed is an air press for dewatering a wet web, which can also be used as a pre-dryer in the present invention, with or without the use of heated air or steam.

The Paper

The improved paper web of this invention, which is sometimes known to the trade as a paper towel web, is preferably made by the process described above. It is characterized as having two distinct regions, and at least a portion of either region has a bonding material that penetrates at least a portion of the thickness of the paper web.

The first region is a network region that may be continuous, macroscopically monoplanar, and which forms a preselected pattern. It is called a "network region" because it comprises a system of lines of essentially uniform physical characteristics which intersect, interlace, and cross like the fabric of a net. In some embodiments, it can be described as "continuous" because the lines of the network region are essentially uninterrupted across the surface of the web. (Naturally, because of its very nature, paper is never completely uniform, e.g., on a microscopic scale. The lines of essentially uniform characteristics are uniform in a practical sense and, likewise, uninterrupted in a practical sense.) In some embodiments, the network region is described as "macroscopically monoplanar" because, when the web as a whole is placed in a planar configuration, the top surface (i.e. the surface lying on the same side of the paper web as the protrusions of the domes) of the network is essentially planar. (The preceding comments about microscopic deviations from uniformity within a paper web apply here as well as above.) The network region is described as forming a preselected pattern because the lines define (or outline) a specific shape (or shapes) in a repeating (as opposed to random) pattern.

Figure 8:
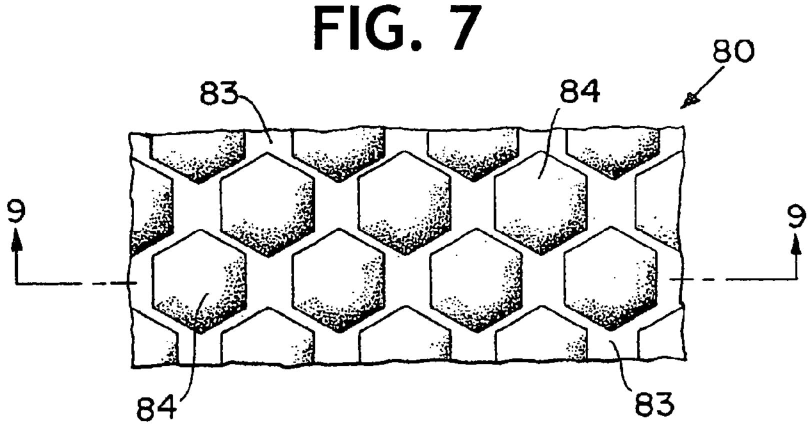
FIG. 8 is a simplified plan view of a portion of a paper web of this invention.

FIG. 8 illustrates in plan view a portion of a paper web 80 of this invention. Network region 83 is illustrated as defining hexagons, although it is to be understood that other preselected patterns are useful in this invention.

Figure 9:
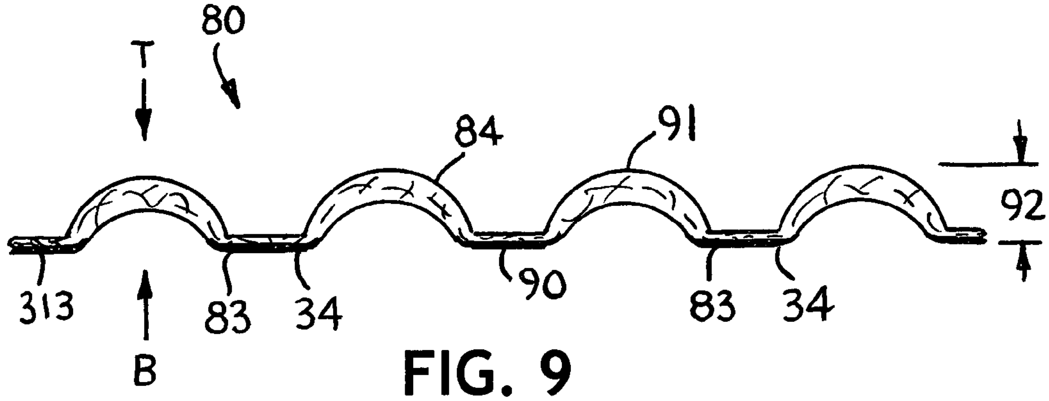
FIG. 9 is a cross sectional view of a portion of the paper web shown in FIG. 8 as taken along line 9—9.

FIG. 9 is a cross-sectional view of paper web 80 taken along line 9—9 of FIG. 8. As can be seen from FIG. 9, network region 83 is essentially monoplanar comprising a first elevation 90.

The second region of the improved paper web of this invention comprises a plurality of domes dispersed throughout the whole of the network region forming a second elevation 91. In FIGS. 8 and 9 the domes are indicated by reference numeral 84. As can be seen from FIG. 8, the domes are dispersed throughout network region 83 and essentially each is encircled by network region 83. The shape of the domes (in the plane of the paper web) is defined by the network region. FIG. 9 illustrates the reason the second region of the paper web is denominated as a plurality of "domes." Domes 84 appear to extend from (protrude from) the first elevation 90 formed by network region 83 toward an imaginary observer looking in the direction of arrow T at the paper web. When viewed by an imaginary observer looking in the direction indicated by arrow B in FIG. 9, the second region comprises arcuate shaped voids which appear to be cavities or dimples. The second region of the paper web has thus been denominated a plurality of "domes" for convenience. The paper structure forming the domes can be intact; it can also be provided with one or more holes or openings extending essentially through the structure of the paper web.

The paper web of the present invention can have a difference in elevation 92 between the first and second elevations of at least about 0.13 millimeters (0.005 inches). The difference in elevation 92 is measured without a confining pressure, using microtomoscopy or stereoscopic three-dimensional scanning electron microscopy imaging, as are well known in the art.

In one embodiment of the present invention, the network region has a relatively low basis weight compared to the basis weights of the domes. That is to say, the weight of fiber in any given area projected onto the plane of the paper web of the network region is less than the weight of fiber in an equivalent projected area taken in the domes. Further, the density (weight per unit volume) of the network region can be high relative to the density of the domes. It appears that the difference in basis weights are initially created as an artifact of the preferred method of manufacture described above. At the time the embryonic web is associated with the deflection member, the embryonic web has an essentially uniform basis weight. During deflection, fibers are free to rearrange and migrate from adjacent the network surface into the deflection conduits thereby creating a relative paucity of fibers over the network surface and a relative superfluity of fibers within the deflection conduits. The same forces tending to cause rearrangement of the fibers tend to compress the web over the network surfaces relative to that portion of the web within the deflection conduits. Imprinting the network surface into the paper web in the described process tends to further compress that portion of the web in contact with the network surface, and also applying bonding material to the network region both combine to further exaggerate the difference in density between the two regions.

In a second embodiment, the basis weight of the domes and the network region are essentially equal, but the densities of the two regions differ as indicated above. In certain embodiments of the present invention there can be an enrichment of the domes in shorter papermaking fibers as compared to the network region. That is to say, there can be relatively more short fibers in the domes than in the network region; the average fiber length of the domes can be smaller than the average fiber length of the network region. The relative superfluity of shorter fibers in the domes and the relative superfluity of longer fibers in the network region can serve to accentuate the desirable characteristics of each region. That is, the softness, absorbency, and bulk of the domes are enhanced and, at the same time, the strength of the network region is enhanced.

Continuing to refer to FIG. 9, the bonding material 313, in certain embodiments, penetrates only through a portion of the paper web's thickness in the network regions as illustrated by the heavier shading indicating its presence. The bonding material is substantially coincident with the surface area of the network region and penetrates the paper web from surface B opposite the domes. The majority of the bonding material present (greater than 50%) is disposed in the network region. Although, as previously discussed, it is possible for a minority of the bonding material present to be disposed within the domed regions of the paper web. Alternatively, the bonding material can be applied to the network regions and instead penetrate the opposing surface T (not shown).

Bond material penetrated paper webs of this invention can have an apparent (or bulk or gross) density of from about 0.015 to about 0.150 grams per cubic centimeter, or from about 0.040 to about 0.100 g/cc. The density of the network region can be from about 0.300 to about 0.900 g/cc or from about 0.500 to about 0.700 g/cc. The average density of the domes can be from about 0.040 to about 0.250 g/cc or from about 0.060 to about 0.100 g/cc. The overall basis weight of the paper web can be from about 9 to about 95 grams per square meter. Considering the number of fibers underlying a unit area projected onto the portion of the web under consideration, the ratio of the basis weight of the network region to the average basis weight of the domes is from about 0.7 to about 1.2.

As indicated above, an optional step in the process for making the web of this invention is foreshortening. Foreshortening has been defined as the alteration of the web produced by supplying energy to the dry web in such a manner as to interrupt fiber-fiber bonds and to rearrange the fibers in the web. While foreshortening can take a number of forms, creping is the most common one. For convenience, foreshortening will be discussed at this point in terms of creping.

Those skilled in the art are familiar with the effect of creping on paper webs. In a simplistic view, creping provides the web with a plurality of microscopic or semi-microscopic corrugations which are formed as the web is foreshortened, the fiber-fiber bonds are broken, and the fibers are rearranged. In general, the microscopic or semi-microscopic corrugations extend transversely across the web. That is to say, the lines of microscopic corrugations are perpendicular to the direction in which the web is traveling at the time it is creped (i.e. perpendicular to the machine direction). They are also parallel to the line of the doctor blade which produces the creping. The crepe imparted to the web is more or less permanent so long as the web is not subjected to tensile forces which can normally remove crepe from a web. In general, creping provides the paper web with extensibility in the machine direction.

During a normal creping operation, the network portions of paper web are adhesively adhered to the creping surface (e.g. the Yankee dryer drum) by the bonding material and/or creping adhesives if used. As the web is removed from the creping surface by the doctor blade, creping is imparted to the web in those areas which are adhered to the creping surface. Thus, the network region of the web of this invention is directly subjected to creping. Since the network region and the domes are physically associated in the web, a direct effect on the network region can have an indirect effect on the domes. In general, the effects produced by creping on the network region (the higher density regions) and the domes (the lower density regions) of the web are different. It is believed that one of the most notable differences is an exaggeration of strength properties between the network region and the domes. That is to say, since creping destroys fiber-fiber bonds, the tensile strength of a creped web is reduced.

It is believed that in the paper web of the present invention, while the tensile strength of the network region is reduced by creping, the tensile strength of the dome is concurrently reduced a relatively greater extent. Thus, the difference in tensile strengths between the network region and the domes appears to be exaggerated by creping. Differences in other properties can also be exaggerated depending on the particular fibers used in the web and the network region and dome geometries. The addition of the bonding material to the network region of the paper can greatly increase this effect, such that the difference in the tensile strength between the network region and the domes is exaggerated even more. When the majority of the bonding material is disposed in the network region, the bonding material can double the difference in the tensile strength between the network and the domes.

The creping frequency (i.e. the number of corrugations per unit length in the machine direction of the web) is dependent on a number of factors including the thickness of the network region, the absolute strength of the network region, the nature of the adhesive association between the network region and the creping surface, the preselected pattern of the network region, and the amount and type of bonding material. It has been observed that the creping frequency is higher in the network region than in the domes.

As noted above, foreshortening or creping is known to enhance the extensibility of the creped web in the machine direction. When the preselected network pattern is one of the patterns mentioned above, such as that described in connection with FIG. 10, creping enhances extensibility not only in the machine direction but also in the cross machine direction and in other intermediate directions, all dependent on, among other things, the preselected pattern of the network region. It has also been observed that foreshortening enhances the flexibility of the web.

The bond material penetrated paper web can have a Wet Out Time (WOT) of about 3.5 seconds or greater, about 4 seconds or greater, or about 5 seconds or greater. As used herein, "Wet Out Time" is a measure of how fast the paper towel product absorbs water and reaches its absorbent capacity, expressed in seconds. In particular, the WOT is determined by selecting and cutting 20 representative product specimen sheets into squares measuring 63 millimeters by 63 millimeters (±3 mm.). The resulting pad of 20 product sheets is stapled together across each corner of the specimen pad just far enough from the edges to hold the staples. The staples should be oriented diagonally across each corner and should not wrap around the edges of the test specimen. With the staple points facing down, the specimen is held horizontally over a pan of water approximately 25 millimeters from the surface of the water. The specimen is dropped flat onto the surface of the water and the time for the specimen to become visually completely saturated with water is recorded. This time, measured to the nearest 0.1 second, is the WOT for the product. At least five (5) replicate measurements are made on the same sample to yield an average WOT value.

The bond material penetrated paper web can have a CD Wet/Dry Tensile Ratio of about 45% or greater, about 50% or greater, or about 60% or greater. The wet/dry tensile ratio is determined by dividing the cross machine direction wet tensile strength by the cross machine direction dry tensile strength, as expressed by the following equation: Wet/Dry Tensile Ratio=CDwet/CDdry where CDwet is the average cross machine direction wet tensile strength, and where CDdry is the average cross machine direction dry tensile strength. The cross machine direction wet tensile strength is determined by wetting the sample first in the center of the sample before any testing is performed. The sample is wetted by forming a loop of the specimen and wetting it with distilled water, ensuring it completely wetted from one edge to the other edge. After wetting, the sample is immediately inserted into the tester grips of a tensile tester such that the moistened center region is parallel to the jaws and centered between the jaws. Tensile strengths are reported in kilograms of force per 3 inches (76.2 mm) of sample width, but may be expressed simply as kilograms for convenience.

To determine the tensile strengths, a tensile tester is utilized, such as a Sintech tensile tester, manufactured by Sintech Inc., Research Triangle Park, N.C. 27709. Under TAPPI test conditions, a sample of the paper product is placed into the jaws of the tensile tester. The jaws are generally a pair of rectangular pieces which clamp the sample between the two pieces without slippage during the test. The test sample is 3 inches (76.2 mm) wide in the cross machine direction and of sufficient length in the machine direction to insert into the clamps of the tensile tester. The gage length between the jaws is 4.0 inches (102 mm) for towels and facial tissues and 2.0 inches (51 mm) for perforated bath tissues removed from a roll.

After the sample is placed into the jaws, one jaw moves upward and the second jaw is usually stationary. The moving jaw has a load cell attached to it, which measures the load placed on the sample. The maximum capacity of the load cell chosen should be the minimum size necessary to measure the sample's tensile strength without overloading the load cell. This may require changing the load cell between the dry and wet samples. The test is conducted with the moving jaw traveling at a rate of 10 inches per minute (254 mm/min.). The tensile tester is calibrated according the manufacturer's directions, a sample is inserted, and the maximum tensile load for each sample at the test speed is determined using a data acquisition program having a sufficient sampling rate to accurately record the maximum load. At least ten samples are tested in both the dry and wet state. The average of the dry samples and the average of the wet samples are determined. The Wet/Dry Tensile Ratio is then determined by dividing the wet average CD tensile load by the dry average CD tensile load.

The bond material penetrated paper web of this invention can be used in any application where soft, absorbent tissue paper webs are required. One particularly advantageous use of the paper web of this invention is in paper towel products. For example, two paper webs can be secured together in a face-to-face relationship, as known in the art, to form a 2-ply paper towel. In one embodiment, two paper webs, as illustrated in FIG. 9, are plied together such that the domes from one web are placed in a face to face relationship with the domes on the second web. In such an arrangement, the exterior surfaces of the 2-ply web can have the bonding material disposed primarily in the network regions providing the desired strength, extensibility, and durability for the 2-ply towel while the concave inwardly facing domes provide excellent absorbent capacity and/or absorbent rate to readily clean spills. Alternatively, the network regions of the two paper webs can be placed in a face-to-face relationship or the network region of one paper web can be placed in a face-to-face relationship with the domes of the second paper web.

While a particular process has been described above to produce paper webs of the present invention, other processes or hand sheet formation techniques known to those of skill in the art can be used to produce paper webs of the present invention. In particular, the following patents either describe paper webs, deflection members, or processes to make paper webs: U.S. Pat. No. 4,528,239 issued to Trokhan Jul. on 9, 1985; U.S. Pat. No. 4,529,480 issued to Trokhan on Jul. 16, 1985; U.S. Pat. No. 4,637,859 issued to Trokhan on Jan. 20, 1987; U.S. Pat. No. 5,529,664 issued to Trokhan et al. on Jun. 25, 1996; U.S. Pat. No. 5,556,509 issued to Trokhan et al. on Sep. 17, 1996; U.S. Pat. No. 5,637,194 issued to Ampulski et al. on Jun. 10, 1997; U.S. Pat. No. 5,709,775 issued to Trokhan et al. on Jan. 20, 1998; U.S. Pat. No. 5,776,312 issued to Trokhan et al. on Jul. 7, 1998; U.S. Pat. No. 5,804,036 issued to Phan et al. on Sep. 8, 1998; U.S. Pat. No. 5,820,730 issued to Phan et al. on Oct. 13, 1998; U.S. Pat. No. 5,837,103 issued to Trokhan et al. on Nov. 17, 1998; U.S. Pat. No. 5,846,379 issued to Ampulski et al. on Dec. 8, 1998; U.S. Pat. No. 5,855,739 issued to Ampulski et al. on Jan. 5, 1999; U.S. Pat. No. 5,893,965 issued to Trokhan et al. on Apr. 13, 1999; U.S. Pat. No. 5,897,745 issued to Ampulski et al. on Apr. 27, 1999; U.S. Pat. No. 5,904,811 issued to Ampulski et al. on May 18, 1999; U.S. Pat. No. 5,906,710 issued to Trokhan et al. on May 25, 1999; U.S. Pat. No. 5,935,381 issued to Trokhan et al. on Aug. 10, 1999; U.S. Pat. No. 6,039,839 issued to Trokhan et al. on Mar. 21, 2000; U.S. Pat. No. 6,103,062 issued to Ampulski et al. on Aug. 15, 2000; U.S. Pat. No. 6,117,270 issued to Trokhan et al. on Sep. 12, 2000; U.S. Pat. No. 6,136,146 issued to Phan et al. on Oct. 24, 2000; U.S. Pat. No. 6,193,847 issued to Trokhan et al. on Feb. 27, 2001; and U.S. Pat. No. 6,464,831 issued to Trokhan et al. on Oct. 15, 2002, all of which are herein incorporated by reference.

With regard to all incorporated references, they are incorporated only to the extent that they are not contradictory or inconsistent with the information in this application. In the event of contradictions or inconsistencies between the incorporated references and this application, the information present in this application shall prevail.

What is claimed:

1. A paper web comprising:

a macroscopically monoplanar cellulosic substrate having two elevations, a first elevation defining a first pattern comprising an essentially continuous network and a second elevation defining a second pattern comprising a plurality of discrete domes extending outward from the first elevation; the domes having a protuberance on one side and a depression on an opposing side;

a bonding material disposed on at least a portion of either elevation of the cellulosic substrate; and wherein a majority of the bonding material is disposed on the continuous network and the bonding material penetrates at least partially through a thickness of the cellulosic substrate.

2. The paper web of claim 1 wherein the majority of the bonding material is disposed on the continuous network on a surface of the paper web opposite the protuberances.

3. The paper web of claim 1 wherein the bonding material penetrates about 60% or less through the thickness of the cellulosic substrate.

4. The paper web of claim 1 wherein the bonding material penetrates about 5% or more through the thickness of the cellulosic substrate.

5. The paper web of claim 1 wherein the bonding material penetrates about 10% to about 90% through the thickness of the cellulosic substrate.

6. The paper web of claim 1 comprising a surface area of one side of the paper web and wherein the bonding material occupies about 5% or greater of the surface area of one side of the paper web.

7. The paper web of claim 1 comprising a surface area of one side of the paper web and wherein the bonding material occupies about 60% or less of the surface area of one side of the paper web.

8. The paper web of claim 1 comprising a surface area of one side of the paper web and wherein the bonding material occupies from about 20% to about 80% of the surface area of one side of the paper web.

9. The paper web of claim 1 comprising a ratio of the bonding material mass to the fiber mass in the paper web of about 3% or greater.

10. The paper web of claim 1 comprising a ratio of the bonding material mass to the fiber mass in tile paper web of about 3% to about 60%.

11. The paper web of claim 1 comprising a melting temperature of the bonding material of about 40° C. to about 200° C.

12. The paper web of claim 1 comprising a glass transition temperature, Tg, of the bonding material from about −100° C. to about 150° C.

13. The paper web of claim 1 comprising a glass transition temperature, Tg, of the bonding material from about −40° C. to about 30° C.

14. The paper web of claim 1 comprising a glass transition temperature, Tg, of the bonding material from about −10° C. to about 10° C.

15. The paper web of claim 1 comprising a viscosity of the bonding material of about 10 poise or less.

16. The paper web of claim 1 comprising a viscosity of the bonding material of about 0.5 poise to about 5 poise.

17. The paper web of claim 1 comprising a viscosity of the bonding material of about 0.5 poise to about 50 poise.

18. The paper web of claim 1 comprising a viscosity of the bonding material of about 20 poise to about 2,000 poise.

19. The paper web of claim 1 comprising a Wet Out Time of about 3.5 seconds or greater.

20. The paper web of claim 1 comprising a CD Wet/Dry Tensile Ratio of about 45% or greater.

21. The paper web of claim 1 wherein the bonding material comprises an emulsified polymer.

22. The paper web of claim 21 wherein the emulsified polymer comprises latex.

23. The paper web of claim 21 wherein the emulsified polymer is latex free.

24. The paper web of claim 1 wherein the bonding material is cationic.

25. The paper web of claim 1 wherein the bonding material is anionic.

26. The paper web of claim 1 wherein the bonding material is nonionic.

27. The paper web of claim 1 wherein the bonding material is amphoteric.

28. The paper web of claim 1 wherein the bonding material comprises a photocured polymer.

29. The paper web of claim 1 wherein the bonding material is hydrophilic.

30. The paper web of claim 1 wherein the bonding material is hydrophobic.

31. The paper web of claim 1 wherein the cellulosic substrate is creped.

32. The paper web of claim 1 comprising a colored bonding material wherein a HunterLab Color Scale measurement of a 50 micron film of the bonding material on a white substrate yields a sum of about 10 or greater for the absolute value of the "a" value plus the absolute value of the "b" value.

33. The paper web of claim 32 wherein the sum of the absolute value of "a" plus the absolute value of "b" is about 15 or greater.

34. The paper web of claim 32 wherein the sum of the absolute value of "a" plus the absolute value of "b" is about 25 or greater.

35. The paper web of claim 1 comprising a colored bonding material wherein a HunterLab Color Scale measurement of a 50 micron film of the bonding material on a white substrate yields an "L" value of less than about 90.

36. The paper web of claim 35 wherein the "L" value is less than about 85.

37. The paper web of claim 35 wherein the "L" value is less than 80.

38. The paper web of claim 1 wherein the bonding material comprises a Gardner Color of about 4 or less.

39. A multi-ply paper web comprising:

a first ply comprising a macroscopically monoplanar cellulosic substrate having two elevations, a first elevation defining a first pattern and a second elevation defining a second pattern; the first pattern comprising an essentially continuous network and the second pattern comprising a plurality of discrete domes extending outwardly from the first elevation; the domes having a protuberance on one side and a depression on an opposing side;

a bonding material disposed on the essentially continuous network of the first ply, and wherein the bonding material penetrates at least partially through a thickness of the cellulosic structure; and a second ply comprising a macroscopically monoplanar cellulosic substrate having two elevations, a first elevation defining a first pattern and a second elevation defining a second pattern; the first pattern comprising an essentially continuous network and the second pattern comprising a plurality of discrete domes extending outwardly from the first elevation; the domes having a protuberance on one side and a depression on an opposing side;

a bonding material disposed on the essentially continuous network of the second ply, and wherein the bonding material penetrates at least partially through a thickness of the cellulosic substrate web.

40. The multi-ply paper web of claim 39 wherein the domes of the first ply are orientated towards the domes of the second ply.

41. The multi-ply paper web of claim 39 wherein the network region of the first ply is orientated towards the network region of the second ply.

42. The multi-ply paper web of claim 39 wherein the domes of the first ply are orientated towards the network region of the second ply.

43. The multi-ply paper web of claim 40 wherein a majority of the bonding material on both plies is disposed on the continuous network.

44. The multi-ply paper web of claim 43 wherein the majority of the bonding material on both plies forms at least a portion of both exterior surfaces of the multi-ply paper web.

45. The multi-ply paper web of claim 44 wherein the bonding material penetrates at least about 10% or greater through the thickness of the network regions.

46. The multi-ply paper web of claim 39 wherein the first and second plies are crimped together.

47. The multi-ply paper web of claim 39 wherein the first and second plies are adhesively bonded together.

48. The paper web of claim 1 wherein the bonding material comprises a composition containing nitrogen.

49. The paper web of claim 1 wherein the bonding material comprises a thermoplastic.

50. A paper web comprising:

a macroscopically monoplanar, patterned continuous network region having a basis weight and a density;

a plurality of discrete domes having either a higher basis weight or a lower density than the network region, essentially all of the domes being dispersed throughout and encompassed by, and isolated one from another by the network region; the domes having a protuberance on one side and a depression on an opposing side;

a bonding material disposed on at least a portion of either the network region or the domes; and wherein a majority of the bonding material is disposed on the continuous network and the bonding material penetrates at least partially through a thickness of the paper web.

51. The paper web of claim 50 wherein the domes have both a higher basis weight and a lower density than the network region.

52. The paper web of claim 50 wherein the majority of the bonding material is disposed on the continuous network on a surface of the paper web opposite the protuberances.

53. The paper web of claim 52 wherein the bonding material penetrates about 60% or less through the thickness of the cellulosic substrate.

54. The paper web of claim 52 wherein the bonding material penetrates about 5% or more through the thickness of the cellulosic substrate.

55. The paper web of claim 52 wherein the bonding material penetrates about 10% to about 90% through the thickness of the cellulosic substrate.

56. The paper web of claim 52 comprising a surface area of one side of the paper web and wherein the bonding material occupies about 5% or greater of the surface area of one side of the paper web.

57. The paper web of claim 52 comprising a surface area of one side of the paper web and wherein the bonding material occupies about 60% or less of the surface area of one side of the paper web.

58. The paper web of claim 52 comprising a surface area of one side of the paper web and wherein the bonding material occupies from about 20% to about 80% of the surface area of one side of the paper web.

59. The paper web of claim 52 comprising a ratio of the bonding material mass to the fiber mass in the paper web of about 3% or greater.

60. The paper web of claim 52 comprising a ratio of the bonding material mass to the fiber mass in the paper web of about 3% to about 60%.

61. The paper web of claim 52 comprising a melting temperature of the bonding material of about 40° C. to about 200° C.

62. The paper web of claim 52 comprising a grass transition temperature, Tg, of the bonding material from about −100° C. to about 150° C.

63. The paper web of claim 52 comprising a glass transition temperature, Tg, of the bonding material from about −40° C. to about 30° C.

64. The paper web of claim 52 comprising a glass transition temperature, Tg, of the bonding material from about −10° C. to about 10° C.

65. The paper web of claim 52 comprising a viscosity of the bonding material of about 10 poise or less.

66. The paper web of claim 52 comprising a viscosity of the bonding material of about 0.5 poise to about 5 poise.

67. The paper web of claim 52 comprising a viscosity of the bonding material of about 0.5 poise to about 50 poise.

68. The paper web of claim 52 comprising a viscosity of the bonding material of about 20 poise to about 2,000 poise.

69. The paper web of claim 52 comprising a Wet Out Time of about 3.5 seconds or greater.

70. The paper web of claim 52 comprising a CD Wet/Dry Tensile Ratio of about 45% or greater.

71. The paper web of claim 52 wherein the bonding material comprises an emulsified polymer.

72. The paper web of claim 71 wherein the emulsified polymer comprises latex.

73. The paper web of claim 71 wherein the emulsified polymer is latex free.

74. The paper web of claim 52 wherein the bonding material is cationic.

75. The paper web of claim 52 wherein the bonding material is anionic.

76. The paper web of claim 52 wherein the bonding material is nonionic.

77. The paper web of claim 52 wherein the bonding material is amphetoric.

78. The paper web of claim 52 wherein the bonding material comprises a composition containing nitrogen.

79. The paper web of claim 52 wherein the bonding material comprises a thermoplastic.

80. The paper web of claim 52 wherein the bonding material comprises a photocured polymer.

81. The paper web of claim 52 wherein the bonding material is hydrophilic.

82. The paper web of claim 52 wherein the bonding material is hydrophobic.

83. The paper web of claim 52 wherein the cellulosic substrate is creped.

84. The paper web of claim 52 comprising a colored bonding material wherein a HunterLab Color Scale measurement of a 50 micron film of the bonding material on a white substrate yields a sum of about 10 or greater for the absolute value of the "a" value plus the absolute value of the "b" value.

85. The paper web of claim 52 comprising a colored bonding material wherein a HunterLab Color Scale measurement of a 50 micron film of the bonding material on a white substrate yields an "L" value of less than about 90.

86. The paper web of claim 52 wherein the bonding material comprises a Gardner Color of about 4 or less.

* * * * *